US011734517B1

(12) United States Patent
Abi-Akl et al.

(10) Patent No.: US 11,734,517 B1
(45) Date of Patent: Aug. 22, 2023

(54) SYSTEMS AND METHODS FOR MEASURING AUTOMATABILITY OF REPORT GENERATION USING A NATURAL LANGUAGE GENERATION SYSTEM

(71) Applicant: YSEOP SA, Lyons (FR)

(72) Inventors: Hanna Abi-Akl, Paris (FR); Hugues Sézille de Mazancourt, Thiais (FR); Dominique Mariko, Paris (FR); Valentin Pierart, Courbevoie (FR)

(73) Assignee: YSEOP SA, Lyons (FR)

( * ) Notice: Subject to any disclaimer, the term of this patent is extended or adjusted under 35 U.S.C. 154(b) by 0 days.

(21) Appl. No.: 17/683,060

(22) Filed: Feb. 28, 2022

Related U.S. Application Data

(60) Provisional application No. 63/158,454, filed on Mar. 9, 2021.

(51) Int. Cl.
| | | |
|---|---|---|
| *G06F 17/00* | (2019.01) | |
| *G06F 40/30* | (2020.01) | |
| *G06F 40/117* | (2020.01) | |
| *G06F 40/169* | (2020.01) | |
| G06F 40/284 | (2020.01) | |

(52) U.S. Cl.
CPC ............ *G06F 40/30* (2020.01); *G06F 40/117* (2020.01); *G06F 40/169* (2020.01); *G06F 40/284* (2020.01)

(58) Field of Classification Search
CPC ...... G06F 40/30; G06F 40/117; G06F 40/169; G06F 40/284
See application file for complete search history.

(56) References Cited

U.S. PATENT DOCUMENTS

| | | | |
|---|---|---|---|
| 6,947,885 B2* | 9/2005 | Bangalore | G06F 40/211 704/4 |
| 7,987,088 B2* | 7/2011 | Moitra | G06F 16/367 707/711 |
| 10,037,317 B1* | 7/2018 | Kaeser | G06F 40/56 |
| 10,572,606 B1* | 2/2020 | Paley | G06N 5/043 |
| 10,719,542 B1* | 7/2020 | Paley | G06F 40/30 |
| 10,755,046 B1* | 8/2020 | Lewis Meza | G06F 40/205 |
| 11,095,579 B1 | 8/2021 | De Mazancourt et al. | |
| 11,210,473 B1* | 12/2021 | Mariko | G06F 40/30 |
| 11,561,986 B1* | 1/2023 | Sippel | G06F 16/24573 |
| 11,586,827 B2* | 2/2023 | Galitsky | G06F 16/953 |
| 2019/0370337 A1* | 12/2019 | Lee | G06N 3/04 |
| 2020/0334418 A1* | 10/2020 | Platt | G06F 16/3344 |

(Continued)

OTHER PUBLICATIONS

[No Author Listed], Linguistic Features. SpaCy. 2022. 60 pages. https://spacy.io/usage/linguistic-features [Last accessed May 23, 2022].

*Primary Examiner* — Laurie A Ries
(74) *Attorney, Agent, or Firm* — Wolf, Greenfield & Sacks, P.C.

(57) ABSTRACT

Techniques for determining a degree to which a document can be generated using a natural language generation (NLG) system, the NLG system being configured to generate natural language text. The techniques include using at least one computer hardware processor to perform: obtaining a document including text segments; determining a degree to which at least some of the text segments can be generated using the NLG system; generating a report indicating the degree to which the at least some of the text segments can be generated using the NLG system; and outputting the report.

19 Claims, 19 Drawing Sheets

(56) References Cited

U.S. PATENT DOCUMENTS

| | | | | |
|---|---|---|---|---|
| 2020/0356732 A1* | 11/2020 | Salmon | ................... | G06F 40/30 |
| 2020/0372423 A1* | 11/2020 | Sabharwal | ............ | G06F 16/345 |
| 2020/0394273 A1* | 12/2020 | Trim | ...................... | G06N 5/025 |
| 2022/0050973 A1* | 2/2022 | Calapodescu | ........... | G06F 40/56 |
| 2022/0237368 A1* | 7/2022 | Tran | ....................... | G06N 3/045 |

* cited by examiner

406a 

422
Determine whether a word in the first text segment is included in a first vocabulary of a plurality of vocabularies that is associated with a first tag of a plurality of tags..

424
When it is determined that the word in the first text segment is included in the first vocabulary of the plurality of vocabularies, tag the word with the first tag.

426
When it is determined that the word in the first text segment is not included in any of the plurality of vocabularies, determine a part-of-speech for the word and tag the word using a tag associated with the part-of-speech.

(ts1) Annotated Representation 1: INDICATOR, VAR, ADP, CURRENCIES, ADP, DATE, DET, GEO (so1) S.O. Annotated Representation 1: INDICATOR, PERCENT, ADP, CURRENCIES, ADP, DATE

880

882 score(ts1, so1) = similarity(ts1, so1) * cosine(ts1, so1)**2 similarity(ts1, so1) = ((len(ts1) + len(so1) – levenshtein(ts1, so1))/ ((len(ts1) + len(so1))

levenshtein(ts1, so1) = INDICATOR, PERCENT, VAR, ADP, CURRENCIES, ADP, DATE, DET, GEO = 4
len(ts1) = 8
len(so1) = 6

884 similarity(ts1, so1) = (8 + 6 – 4)/ (8 + 6) = .714 cosine(ts1, so1) = (ts1 • so1)/ (|ts1||so1|)

|  | INDICATOR | VAR | ADP | CURRENCIES | DATE | DET | GEO | DATE |
|---|---|---|---|---|---|---|---|---|
| ts1 = [ | 1, | 1, | 2, | 1, | 1, | 1, | 1, | 0] |
| so2 = [ | 1, | 0, | 2, | 1, | 1, | 0, | 0, | 1] | ts1 • ex2 = 7
|ts1||so1| = 8.94 cosine(ts1, so1) = 7/8.94 = .78 score(ts1, so1) = .714 * .78 **2 = .43

SYSTEMS AND METHODS FOR MEASURING AUTOMATABILITY OF REPORT GENERATION USING A NATURAL LANGUAGE GENERATION SYSTEM

CROSS-REFERENCE TO RELATED APPLICATIONS

This application claims the benefit of priority under 35 U.S.C. § 119(e) of U.S. provisional patent application No. 63/158,454, titled "SYSTEMS AND METHODS FOR MEASURING AUTOMATABILITY OF REPORT GENERATION USING A NATURAL LANGUAGE GENERATION SYSTEM", filed on Mar. 9, 2021, which is incorporated by reference herein in its entirety.

BACKGROUND

Natural language generation (NLG) is the generation of human-language text (i.e., text in a human language) based on information in non-linguistic form. Natural language generation techniques may be used to generate natural language text for different NLG tasks, for example, to generate a report for a business based on financial data about the business, to generate a textual description of a day of trading of a particular stock based on data indicating the price of the stock throughout the day, to generate a confirmation e-mail for an online purchase made via the Internet based on data describing the purchase, to generate real-time comments about a sporting event using data about the game, or to generate text for a chatbot interacting with a customer based on data about the customer.

SUMMARY

Some embodiments provide for a method for determining a degree to which a document can be generated using a natural language generation (NLG) system, the NLG system being configured to generate natural language text using semantic objects, the method comprising: using at least one computer hardware processor to perform: (A) obtaining a document comprising text segments; (B) determining a degree to which at least some of the text segments can be generated using the NLG system and at least some of the semantic objects; (C) generating a report indicating the degree to which the at least some of the text segments can be generated using the NLG system and the at least some of the semantic objects; and (D) outputting the report.

Some embodiments provide for a system comprising: at least one computer hardware processor; and at least one non-transitory computer-readable storage medium storing processor executable instructions that, when executed by the at least one computer hardware processor, cause the at least one computer hardware processor to perform: (A) obtaining a document comprising text segments; (B) determining a degree to which at least some of the text segments can be generated using the NLG system and at least some of the semantic objects; (C) generating a report indicating the degree to which the at least some of the text segments can be generated using the NLG system and the at least some of the semantic objects; and (D) outputting the report.

Some embodiments provide for at least one non-transitory computer-readable storage medium storing processor executable instructions that, when executed by at least one computer hardware processor, cause the at least one computer hardware processor to perform: (A) obtaining a document comprising text segments; (B) determining a degree to which at least some of the text segments can be generated using the NLG system and at least some of the semantic objects; (C) generating a report indicating the degree to which the at least some of the text segments can be generated using the NLG system and the at least some of the semantic objects; and (D) outputting the report.

In some embodiments, the NLG system is configured to generate natural language text for a plurality of topics using a respective plurality of subsets of the semantic objects, and each subset of the semantic objects is associated with a respective topic in the plurality of topics.

Some embodiments further include processing the document to identify a topic for the document from among the plurality of topics, and generating the report indicating the degree to which the at least some of the text segments can be generated using the NLG system and the at least some of the semantic objects includes determining the degree to which the at least some of the text segments in the document can be generated using the NLG system and at least some of the subset of semantic objects associated with the topic for the document.

In some embodiments, the at least some text segments include a first text segment.

In some embodiments, generating the report indicating the degree to which the at least some of the text segments can be generated using the NLG system and the at least some of the semantic objects includes: generating a first annotated representation for the first text segment; and determining for each semantic object of one or more of the at least some of the semantic objects, a degree to which the first text segment can be generated by the NLG system using the semantic object, the determining including: accessing a plurality of annotated representations for text segments associated with the semantic object; determining measures of similarity between the first annotated representation and the plurality of annotated representations; and determining, using the measures of similarity, the degree to which the first text segment can be generated by the NLG system using the sematic object.

In some embodiments, generating the first annotated representation for the first text segment includes tagging words in the first text segment using tags in a plurality of tags.

In some embodiments, the plurality of tags includes a first tag associated with a first vocabulary in a plurality of vocabularies.

In some embodiments, tagging words in the first text segment using the tags in the plurality of tags includes: determining whether a word in the first text segment is included in a first vocabulary of the plurality of vocabularies; and when it is determined that the word in the first text segment is in the first vocabulary of the plurality of vocabularies, tagging the word with the first tag.

In some embodiments, the plurality of vocabularies includes: a vocabulary having words and/or symbols related to currency, a vocabulary having words and/or symbols related to geography, a vocabulary having words and/or symbols related to diseases, a vocabulary having words and/or symbols related to drugs, a vocabulary having words and/or symbols related to financial indicators, a vocabulary having words and/or symbols related to dates, a vocabulary having words and/or symbols related to percentages, and/or a vocabulary having words and/or symbols related to variation.

In some embodiments, tagging words in the first text segment using the tags in the plurality of tags further includes: when it is determined that the word in the first text segment is not included in any of the plurality of vocabularies, determining a part-of-speech for the word; and tagging the word using a tag associated with the part-of-speech determined for the word.

In some embodiments, the plurality of annotated representations includes a second annotated representation and determining measures of similarities between the first annotated representation and the plurality of annotated representations includes: determining a measure of similarity between the first annotated representation and the second annotated representation, the determining being performed using tags in the first and second annotated representations.

In some embodiments, determining the measure of similarity between the first annotated representation and the second annotated representation includes determining a Levenshtein distance among the tags in the first and second annotated representations.

In some embodiments, determining the degree to which the first text segment can be generated by the NLG system using the sematic object includes identifying a first measure of similarity from among the measures of similarities, the first measure of similarity being associated with a largest measure of similarity from among the measures of similarities.

In some embodiments, generating the report includes generating the report to include information indicative of: a first semantic object of the one or more of the at least some semantic objects that can be used to generate the first text segment; and a degree to which the first text segment can be generated using the first semantic object and the NLG system.

In some embodiments, generating the report includes generating the report to indicate information indicative of a degree to which one or more regions of the document can be generated using the NLG system and the at least some of the semantic objects.

In some embodiments, at least some of the text segments includes second and third text segments; and generating the report includes generating the report to include information indicative of: the second text segment when a degree to which the second text segment can be generated using the NLG system and the at least some of the semantic objects exceeds a specified threshold; and the third text segment when a degree to which the third text segment can be generated using the NLG system and the at least some of the semantic objects does not exceed the specified threshold.

In some embodiments, outputting the report includes outputting the report through a graphical user interface (GUI).

In some embodiments, the GUI is interactive; and the GUI includes selectable elements through which a user can provide input to associate a particular semantic object to a particular text segment.

In some embodiments, the semantic objects include a first semantic object associated with one or more data variables, one or more attributes, a vocabulary, and a document structure.

In some embodiments, the first text segment includes one or more words, a part of a sentence, a sentence, and/or multiple sentences.

BRIEF DESCRIPTION OF DRAWINGS

Various aspects and embodiments of the disclosure provided herein are described below with reference to the following figures. The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4B is a flowchart illustrating an example implementation of act 406a of process 400 shown in FIG. 4A, in accordance with some embodiments of the technology described herein.

FIG. 8B is an example of determining a measure of similarity between annotated representations of respective text segments, in accordance with some embodiments of the technology described herein.

DETAILED DESCRIPTION

Figure 1A:
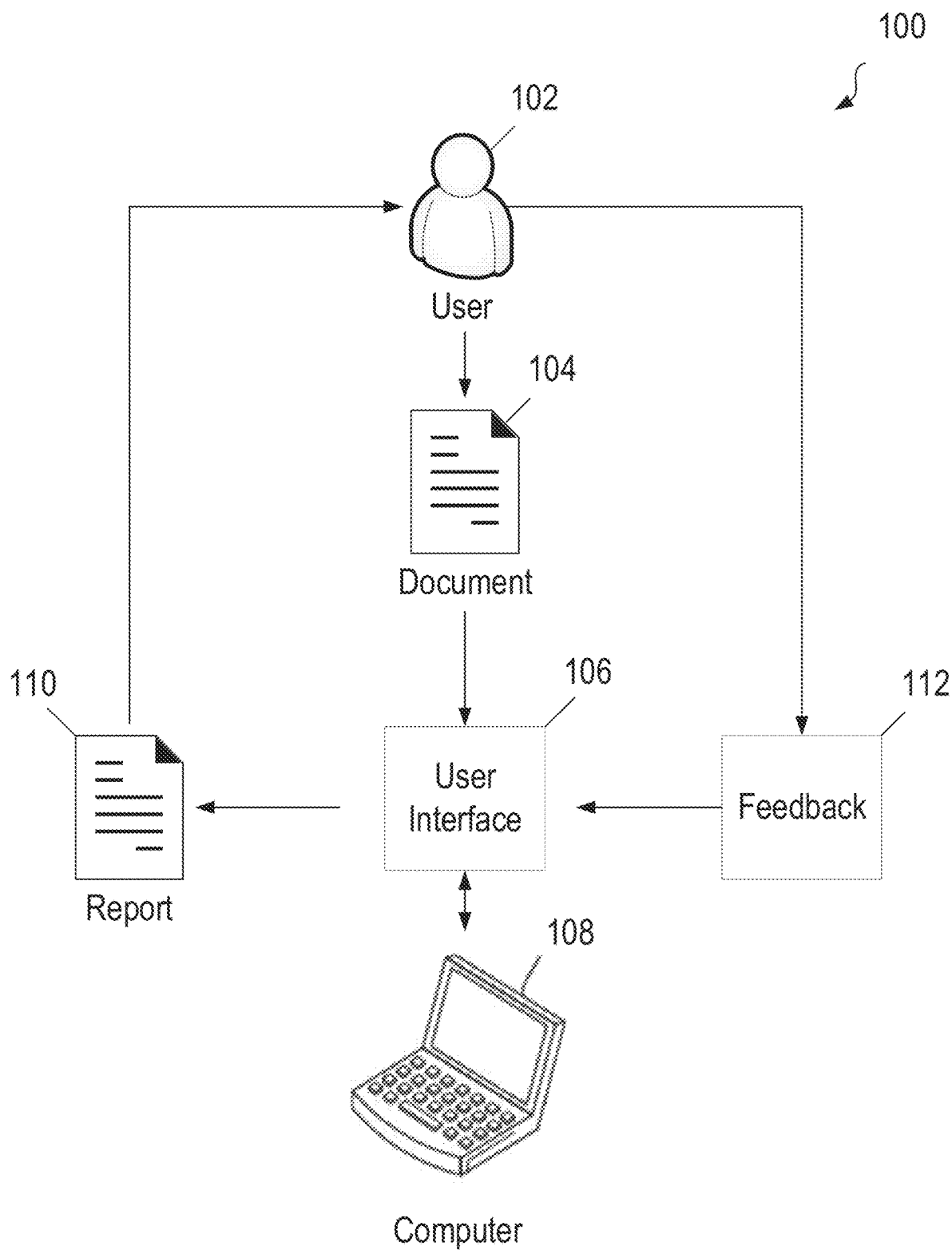
FIGS. 1A-B are diagrams of illustrative techniques for determining a degree to which a document can be generated using an NLG system and semantic objects, in accordance with some embodiments of the technology described herein.

A business generates many documents (e.g., reports, purchase orders, press releases, marketing materials, e-mails, etc.). Generating such documents is a time-consuming task involving substantial manual effort from employees. For example, a bank may employ a financial analyst to generate financial reports for clients. A financial analyst may regularly review large volumes of business data, including elaborate charts, income statements, and balance sheets, and then manually summarize the data. Though necessary, generating financial reports can be repetitive and time consuming, taking away from other tasks that could be valuable to the clients and to the bank. Furthermore, financial reports represent only one of many types of documents that a bank regularly generates. Typically, a bank hires many employees in different departments who are responsible for spending time to similarly generate high quality documents for clients or for the bank itself.

On the other hand, there are natural language generation (NLG) systems, which can be configured to generate certain documents. For example, an NLG system may be configured to analyze provided financial information (e.g., charts, income statements, balance sheets, etc.) and generate natural language text that summarizes the information. Some NLG systems are configured to generate natural language text using semantic objects. Semantic objects are constructs that specify information, such as vocabulary, semantic structure, and document structure, used by an NLG system to generate natural language text segments. Rather than developing an NLG software application for each NLG task, a set of semantic objects can be specified for the task. Aspects of semantic objects are described herein and in U.S. Patent Application Publication No. 2020/0356732 titled "NATURAL LANGUAGE TEXT GENERATION USING SEMANTIC OBJECTS," which is herein incorporated by reference in its entirety.

However, NLG systems may not be well suited to generate every type of document. Consider, for example, an NLG system configured to generate a financial report that summarizes the expenses, revenue, and net earnings of an organization, in a specific order and format. The NLG system will be configured with a specific set of vocabulary related to financial indicators (e.g., sales, EBITDA, assets, balances etc.), and it will structure the text such that it mirrors a financial report that typically would be produced by a financial analyst. As such, the example NLG system may not be suitable to generate other documents, such as marketing brochures and advertisements, that require different vocabularies, sentence structures, and formats.

Configuring an NLG system can be time consuming and unnecessarily repetitive if an existing NLG system is already capable of performing the desired task. The inventors have recognized that it would be helpful to know whether an existing NLG system is capable of automatically generating at least some (e.g., one or more words, one or more phrases, one or more sentences, and/or one or more paragraphs) of a particular document. For example, it would be helpful know if at least some of a brochure could be generated using an NLG system used to generate financial reports. Given this knowledge, the employees producing the brochure could better estimate how much time and effort, if any at all, would be needed to configure the NLG system for the task. Further, they could direct their efforts to focus on the portions of the brochure that cannot be automatically generated.

Accordingly, the inventors have developed techniques for determining a degree to which a document can be automatically generated using an NLG system. In some embodiments, the techniques developed by the inventors involve generating a report indicating the degree to which text segments in the document can be generated using the NLG system. In some embodiments, the techniques described herein may be applied to NLG systems that are configured to generate natural language text using semantic objects and, as such, to determine whether an NLG system configured with a set of semantic objects may be used to generate a particular type of document and the extent to which it can do so.

For example, consider an NLG system configured to generate text in the financial domain. Such a system may be well suited for generating a financial report, but not for generating a medical report. For example, the NLG system may be well suited for generating the text "profit increased by 25% during the fiscal year." However, it may not be well suited for generating the text "5 adverse events occurred after administering acetaminophen." You can determine whether this is the case, by comparing the new text with text that has previously been generated by the NLG system.

Figure 2A:
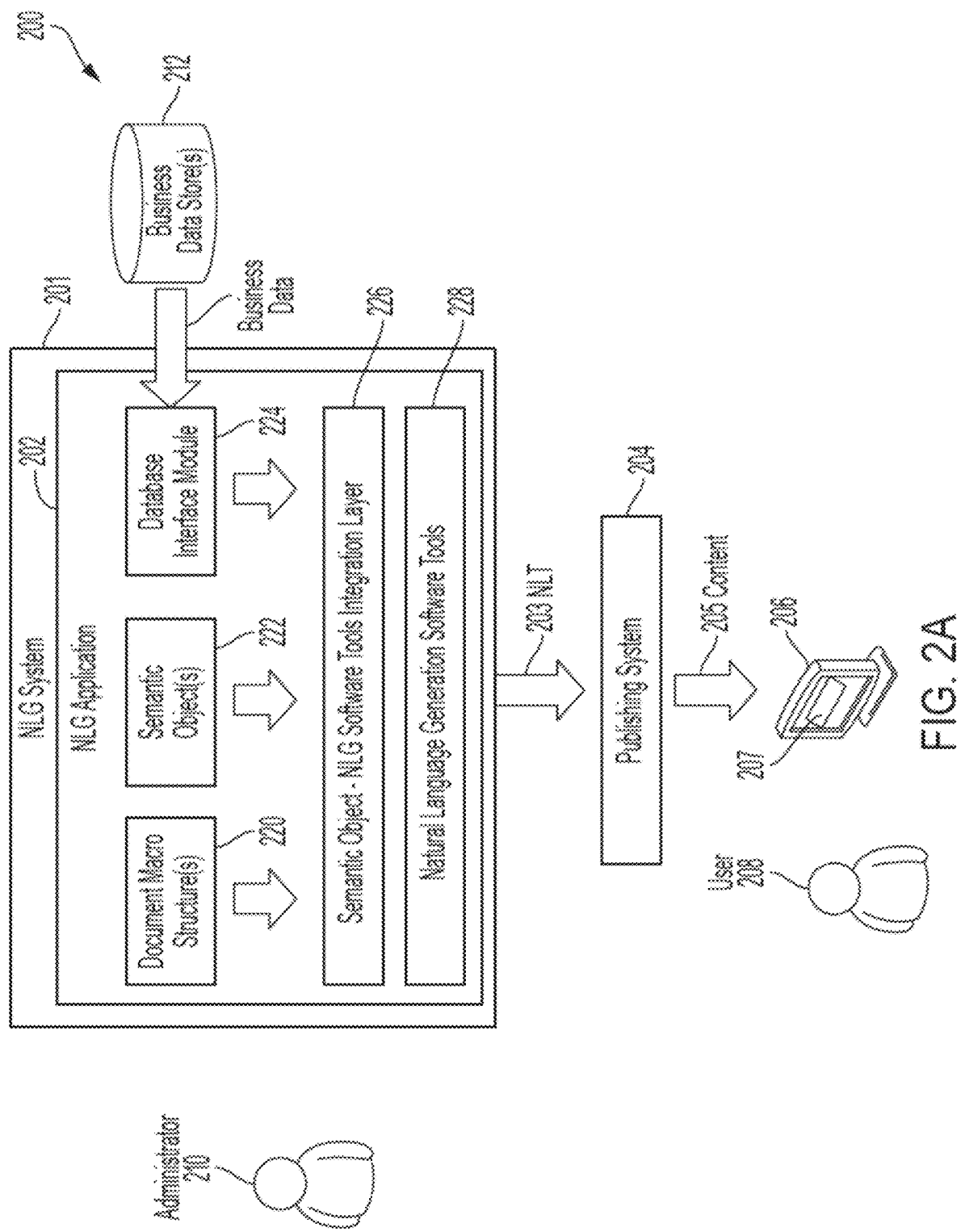
FIG. 2A is a diagram of an illustrative environment 200 in which an NLG system may operate, in accordance with some embodiments of the technology described herein.
Figure 2B:
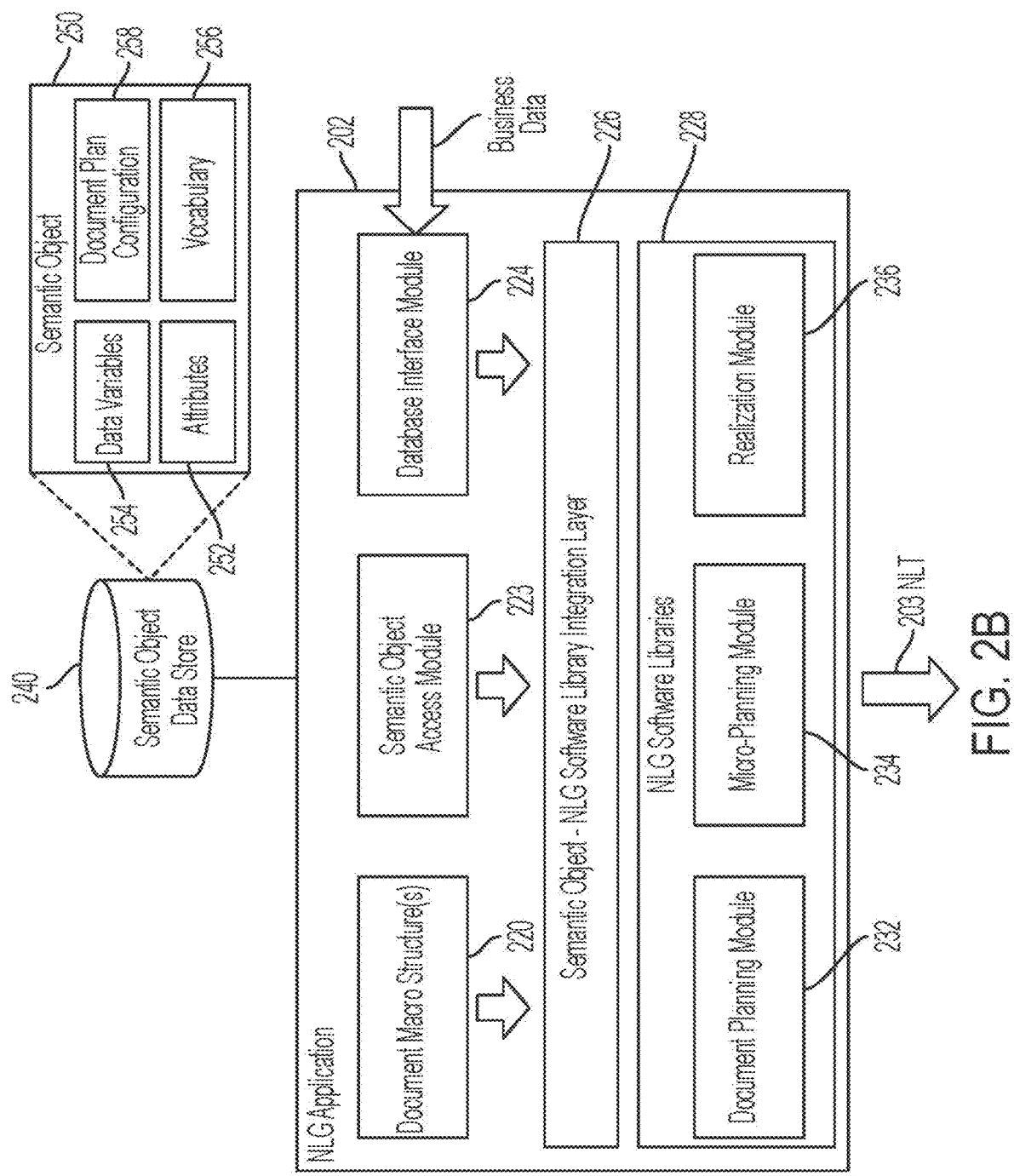
FIG. 2B is a diagram of example components of an illustrative NLG application 202 executing on the NLG system of FIG. 2A and configured to generate natural language text using semantic objects, in accordance with some embodiments of the technology described herein.
Figure 2C:
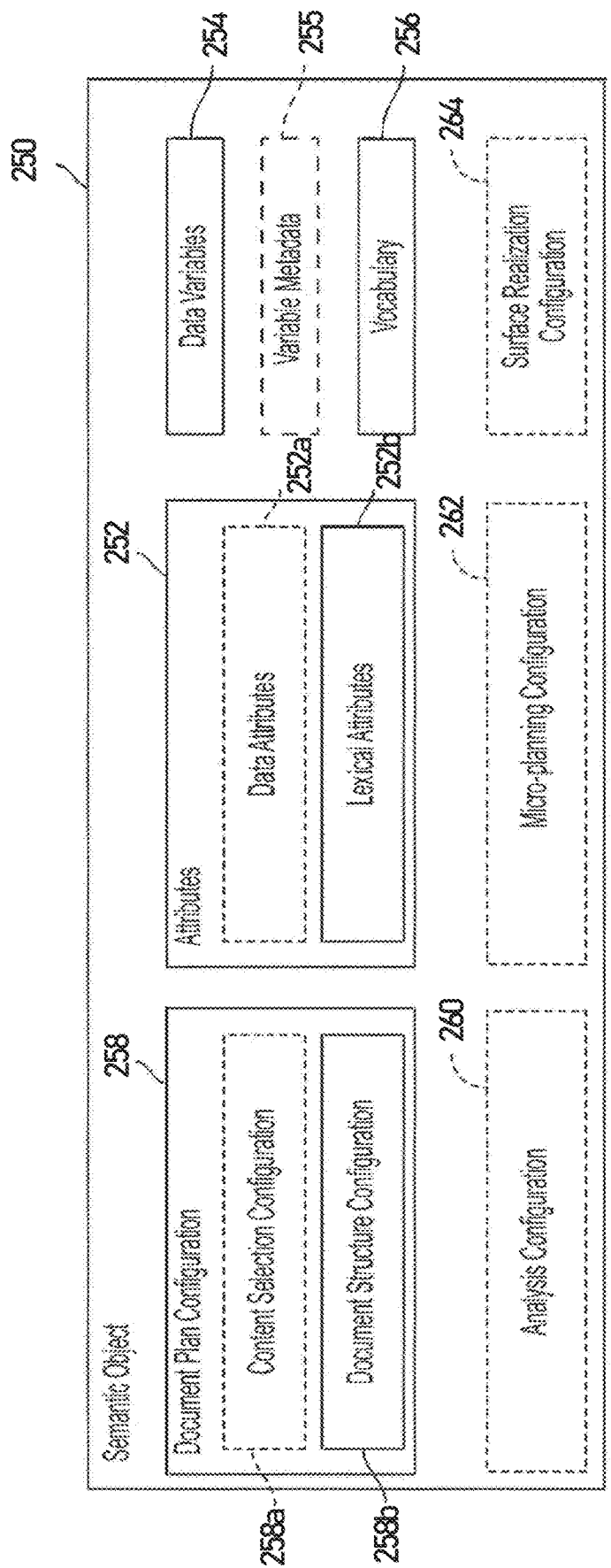
FIG. 2C is a diagram of an illustrative semantic object, in accordance with some embodiments of the technology described herein.

Accordingly, some embodiments provide for computer-implemented techniques to determine a degree to which a document (e.g., reports, purchase orders, press releases, marketing materials, e-mails, etc.) can be generated using a natural language generation (NLG) system (e.g., the illustrative NLG system 201 of FIG. 2A) configured to generate natural language text using semantic objects (e.g., one or more semantic objects like the illustrative semantic object 250 of FIG. 2C). In some embodiments, the techniques include: (A) obtaining a document including text segments (e.g., a phrase of one or more words, a sentence, a set of multiple sentences, etc.); (B) determining a degree (e.g., a percentage) to which at least some of the text segments can be generated using the NLG system and the at least some of the semantic objects; (C) generating a report indicating the degree to which the at least some of the text segments can be generated using the NLG system and at least some of the semantic objects; and (D) outputting the report (e.g., to a graphical user interface (GUI), saving the report to memory, transmitting the report to one or more other computing devices, etc.).

In some embodiments, the NLG system may be configured to generate natural language text for a plurality of topics (e.g., finance topic, a pharmaceutical topic, an agricultural topic, an entertainment topic, or any other suitable topic, etc.) using a respective plurality of subsets of the semantic objects, wherein each subset of the semantic objects is associated with a respective topic in the plurality of topics. For example, a subset of semantic objects associated with finance may be configured to generate text segments that include vocabulary specific to financial reports (e.g., "balance," "expenses," etc.), while a subset of semantic objects associated with the pharmaceutical industry may be configured to generate text segments that include vocabulary specific to medical reports (e.g., "placebo," "adverse event," etc.). Some embodiments further include processing the document to identify a topic for the document from among the plurality of topics. In some embodiments, this may include evaluating the types of words included in text segments in the document. For example, if a document includes words related to pharmaceutical drugs and diseases, then the document may have a topic related to the pharmaceutical industry.

In some embodiments, determining the degree to which at least some of the text segments can be generated using the NLG system and the at least some of the semantic objects includes determining the degree to which the at least some of the text segments in the document can be generated using the NLG system and at least some of the subsets of semantic objects associated with the topic for the document. For example, if a topic related to finance is identified for a document, then subsets of semantic objects used to generate text related to finance may be included in the determination. Only including a portion of the semantic objects may improve the efficiency of the techniques.

In some embodiments, the at least some of the text segments include a first text segment (e.g., a first phrase, a first sentence, and/or first set of sentences). In some embodiments, determining the degree to which at least some of the text segments can be generated using the NLG system and the at least some of the semantic objects includes: generating a first annotated representation (e.g., the illustrative annotated representation 506 of FIG. 5A) for the first text segment (e.g., the illustrative text segment 504 of FIG. 5A); and determining, for each semantic object of one or more of at least some of the semantic objects, a degree to which the first text segment can be generated by the NLG system using the semantic object, the determining including: accessing a plurality of annotated representations of the text segments associated with the semantic object; determining measures of similarity (e.g., Levenshtein distance, cosine similarity, etc.) between the first annotated representation and the plurality of annotated representations; and determining, using the measures of similarity, the degree to which the first text segment can be generated by the NLG system using the semantic object. For example, in some embodiments, the largest measure of similarity may be considered to be the degree to which the first text segment can be generated. In some embodiments, the semantic object associated with the annotated representation (e.g., of the plurality of annotated representations) that resulted in the largest measure of similarity may be output in a report generated using the techniques described herein.

In some embodiments, generating the first annotated representation for the first text segment includes tagging words in the first text segment using tags in a plurality of tags. In some embodiments, the plurality of tags includes a first tag (e.g., currency, percent, date, variation, causality, etc.) associated with a first vocabulary in a plurality of vocabularies. For example, a tag "geo" may be associated with a vocabulary related to geography. As another example, a tag "indicator" may be associated with a vocabulary related to financial indicators. In some embodiments, tagging words in the first text segment using the tags in the plurality of tags includes: determining whether a word in the first text segment is included in a first vocabulary of the plurality of vocabularies; and when it is determined that the word in the first text segment is in the first vocabulary of the plurality of vocabularies, tagging the word with the first tag. In some embodiments, the plurality of vocabularies includes: a vocabulary having words and/or symbols related to currency (e.g., $5, €60,000, etc.), a vocabulary having words and/or symbols related to geography (e.g., U.S.A., China, French, etc.), a vocabulary having words and/or symbols related to diseases (e.g., lymphoma, hypertension, etc.), a vocabulary having words and/or symbols related to drugs (e.g., placebo, adverse event, etc.), a vocabulary having words and/or symbols related to financial indicators (e.g., sales, EBITDA, assets, balance, etc.), a vocabulary having words and/or symbols related to dates (e.g., 1/20/21, October, etc.), a vocabulary having words and/or symbols related to percentages (e.g., 10%, 25%, etc.) and/or a vocabulary having words and/or symbols related to variation (e.g., increased, decrease, etc.).

In some embodiments, tagging words in the first text segment using the tags in the plurality of tags further includes: when it is determined that the word in the first text segment is not included in any of the plurality of vocabularies, determining a part-of-speech (e.g., noun, verb, adverb, adjective, etc.) for the word; and tagging the word using a tag associated with the part-of-speech determined for the word. For example, the word "company" may not be included in any of the plurality of vocabularies. As a result, "company" may be tagged with a tag related to its part-of-speech. In this case "company" may be tagged with the tag "noun."

In some embodiments, the plurality of annotated representations includes a second annotated representation; and determining measures of similarities between the first annotated representation and the plurality of annotated representations includes: determining a measure of similarity (e.g., cosine similarity, Levenshtein distance, etc.) between the first annotated representation and the second annotated representation, the determining being performed using tags in the first and second annotated representations. For example, a measure of similarity may be computed by comparing an annotated representation generated for a text segment in the document to an annotated representation associated with a semantic object. In some embodiments, this may be repeated for other annotated representations associated with the semantic object and for annotated representations associated with other semantic objects. In some embodiments, determining the measure of similarity between the first annotated representation and the second annotated representation includes determining a Levenshtein distance among the tags in the first and second annotated representations.

In some embodiments, determining the degree to which the first text segment can be generated by the NLG system using the semantic object includes identifying a first measure of similarity from among the measures of similarities, the first measure of similarity being associated with a largest measure of similarity from among the measures of similarities. In some embodiments, a largest measure of similarity is identified for each semantic object. These may be used to determine the degree to which each semantic object can be used to generate the text segment. In some embodiments, a largest measure of similarity may then be selected from among the largest measures of similarities associated with each semantic object. This measure of similarity may be used to determine the degree to which the text segment can be generated using the NLG system. In some embodiments, the semantic object associated with the largest measure of similarity may be output in a report.

In some embodiments, generating the report (e.g., the example portions of a report shown in FIGS. 6B-C) includes generating the report to include information indicative of: a first semantic object of the one or more of the least some semantic objects that can be used to generate the first text segment; and a degree (e.g., percentage) to which the first text segment can be generated using the first semantic object and the NLG system. In some embodiments, generating the report includes generating the report to include information indicative of a degree to which one or more regions of the document can be generated using the NLG system and the at least some of the semantic objects. For example, one or more visual representations (e.g., bar plot, pie chart, table, etc.) may be displayed on a GUI that indicate which portions of the document (e.g., one or more words, one or more phrases, one or more sentences, and/or one or more paragraphs) can be generated using the NLG system.

In some embodiments, the at least some text segments includes second and third text segments; and generating the report includes generating the report to include information indicative of: the second text segment when a degree to which the second text segment can be generated using the NLG system and at least some of the semantic objects exceeds a specified threshold (e.g., above 20%, above 40%, above 60%, etc.); and the third text segment when a degree to which the third text segment can be generated using the NLG system and the at least some of the semantic objects does not exceed the specified threshold (e.g., below 20%, below 40%, below 60%, etc.). For example, the text segments may be included to help a user understand which text segments require further configuration of the NLG system and/or semantic objects and which text segments can automatically be generated.

Figure 6A:
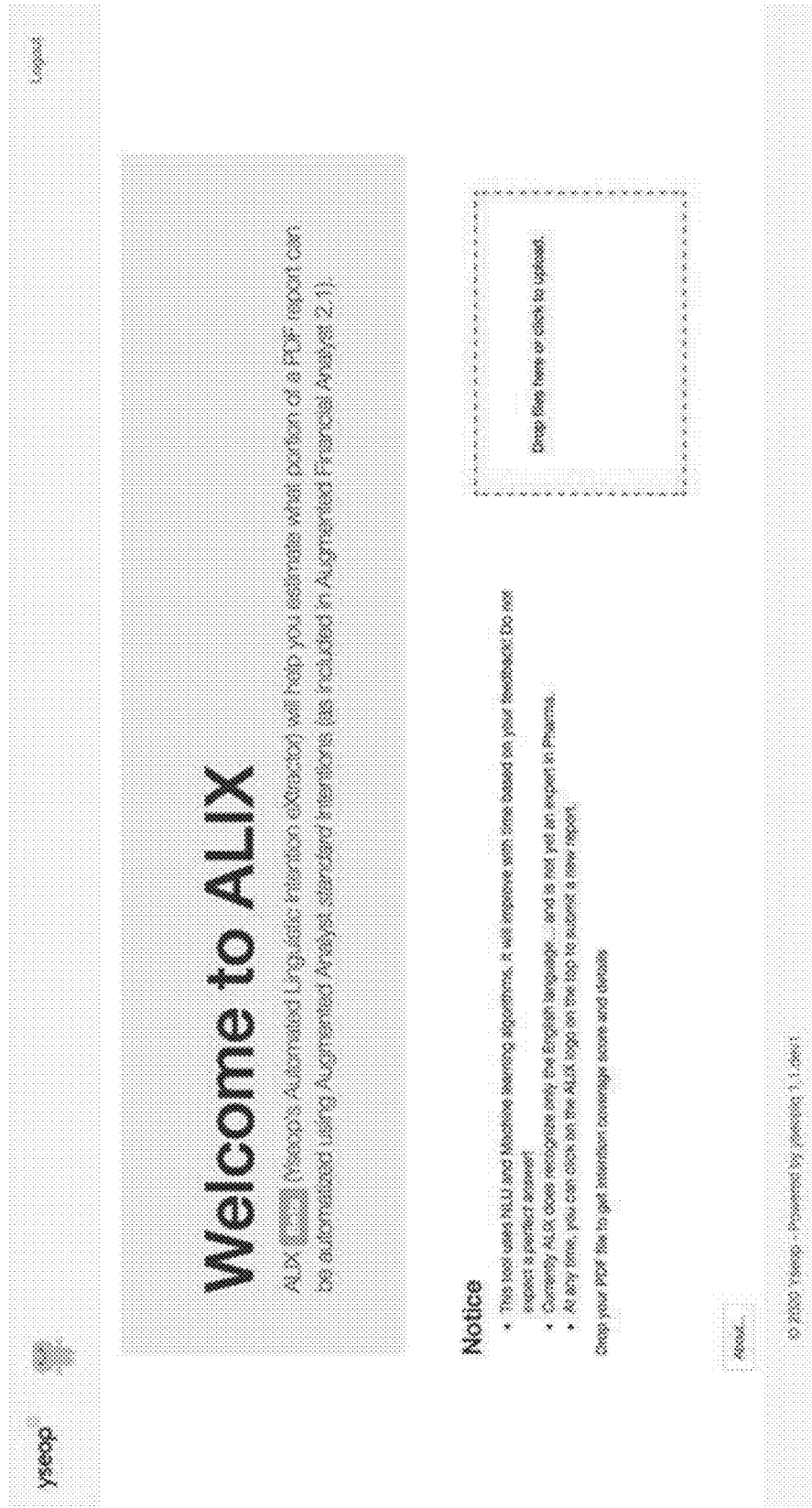
FIG. 6A shows an example of a graphical user interface (GUI) for obtaining a document comprising text segments, in accordance with some embodiments of the technology described herein.
Figure 6B:
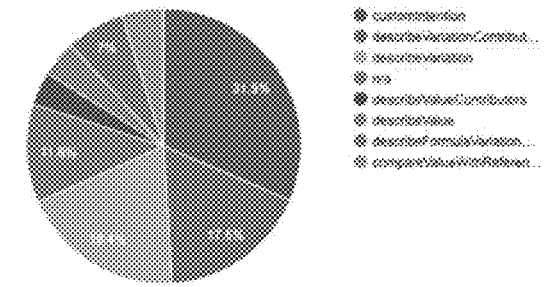
FIG. 6B shows a portion of an example report indicating information indicative of a degree to which one or more regions of a document can be generated using the NLG system configured with semantic objects, in accordance with some embodiments of the technology described herein.
Figure 6B:
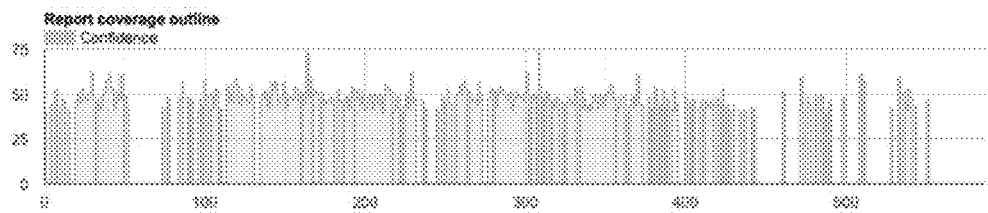
Figure 6C:
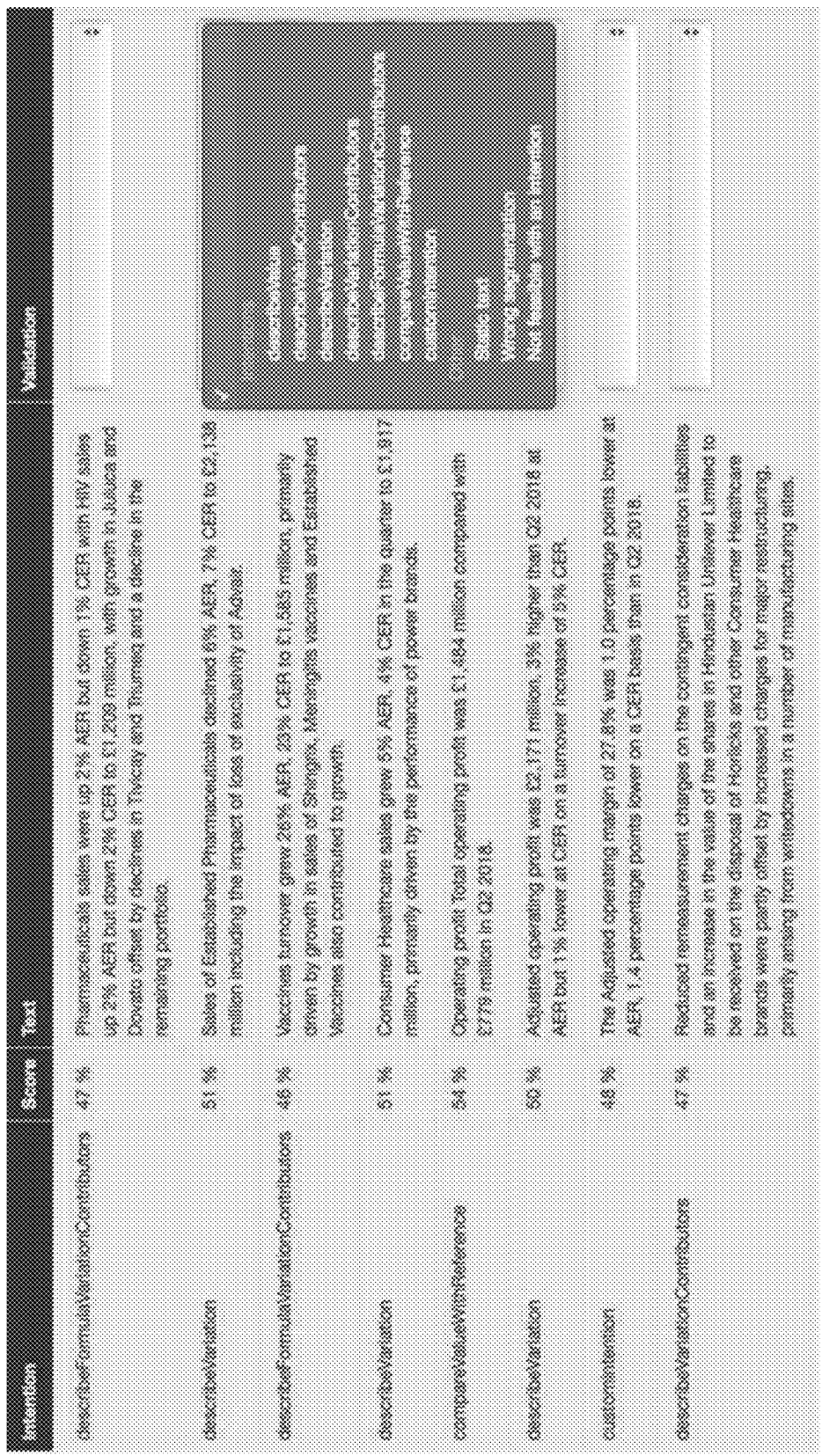
FIG. 6C shows an example portion of a GUI that includes selectable elements through which a user can provide input to associate semantic objects with text segments, in accordance with some embodiments of the technology described herein.

In some embodiments, outputting the report includes outputting the report through a GUI (e.g., the example portions of report shown in FIGS. 6B-C). In some embodiments, the GUI is interactive; and wherein the GUI includes selectable elements (e.g., drop-down menu, checkboxes, freeform text boxes) through which a user can provide input to associate a particular semantic object to a particular text segment.

In some embodiments, the semantic objects include a first semantic object associated with one or more data variables, one or more attributes, and a document structure. In some embodiments, the first text segment includes one or more words, a part of a sentence, a sentence, and/or multiple sentences.

It should be appreciated that the techniques described herein for determining a degree to which a document may be generated using an NLG system may be applied to any suitable type of NLG system. For example, the techniques described herein may be used with NLG systems configured to generate natural language text using semantic objects. Examples of such NLG systems are provided herein. However, the techniques described herein may be applied to other types of NLG systems that do not use semantic objects to generate natural language text, as aspects of the technology described herein are not limited in this respect.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Figure 1B:
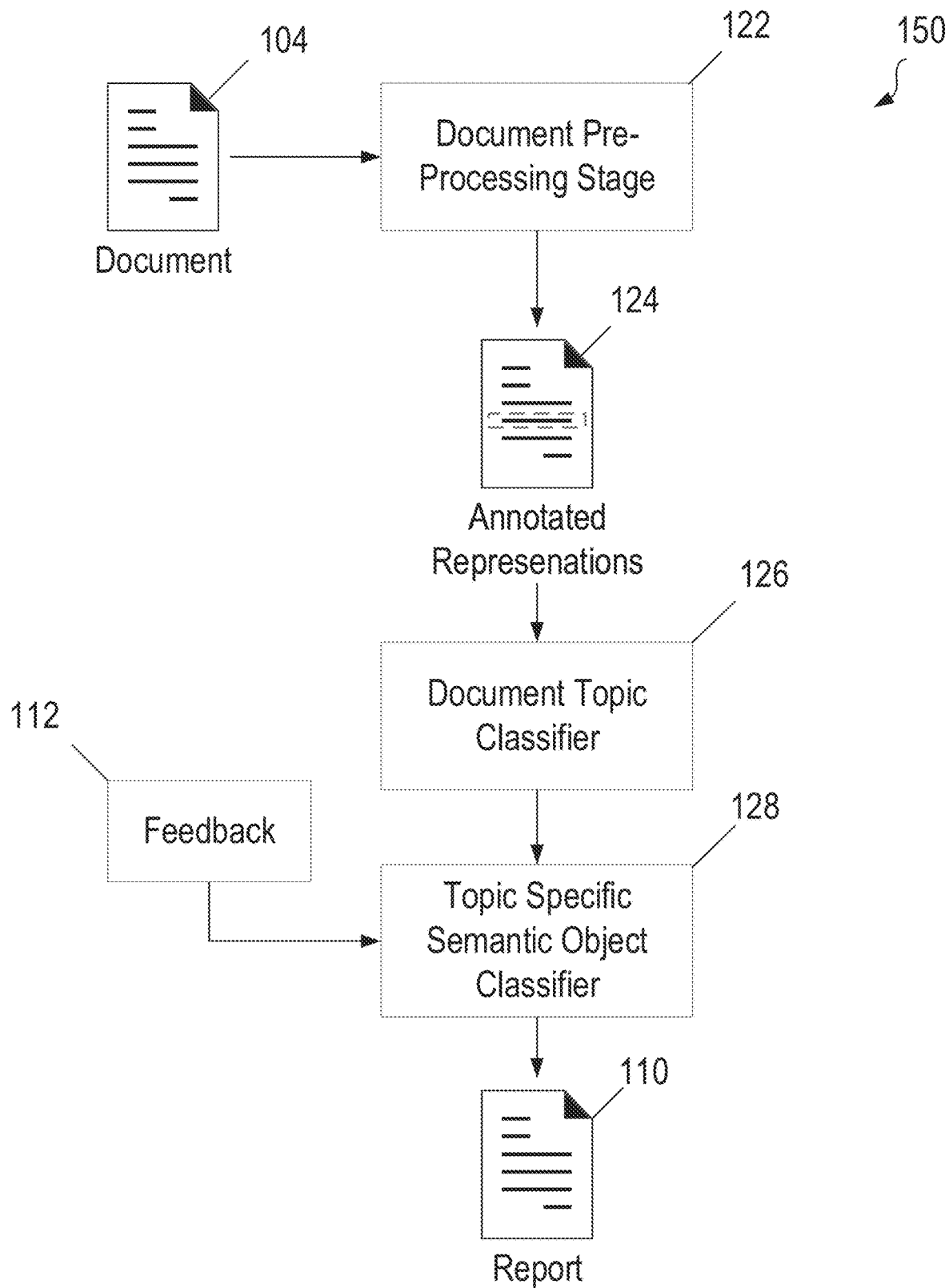

FIGS. 1A-B depict illustrative techniques for determining a degree to which a document can be generated using an NLG system and semantic objects, in accordance with some embodiments of the technology described herein. The techniques may be performed by any suitable computing device(s). For example, the techniques may be performed by a laptop computer, a mobile device, a tablet, a desktop computer, one or more servers, in a cloud computing environment, computing device 900 as described herein including with respect to FIG. 9, and/or in any other suitable way.

As shown in FIG. 1A, the technique 100 involves obtaining a document 104 from user 102 through user interface 106. The document 104 is processed using computing device 108 to generate a report 110, indicating the degree to which document 104 can be generated using an NLG system. Report 110 is then provided to user 102 through user interface 106. User 102 can provide feedback 112 through user interface 106.

In some embodiments, document 104 may be an existing document that a user would like to generate using an NLG system. The document may be a report, e-mail, brochure, webpage, marketing materials and/or any other suitable document, as aspects of the technology described herein are not limited in this respect. For example, the document may be a financial report summarizing financial information related to a specific industry or organization. As another example, the document may include an e-mail advertising information about a new over-the-counter drug. Document 104 may be a PDF file, a plain text file, a Microsoft Word file, a HTML file, an XML file, and/or a file in any other suitable format, as aspects of the technology described herein are not limited in this respect. The document may include one or more words, one or more sentences, and/or one or more paragraphs, and be of any suitable length.

In some embodiments, user 102 may be one or more users. In some embodiments, one user may provide document 104, receive report 110, and provide feedback 112. In some embodiments, multiple users may provide document 104, receive report 110, and provide feedback 112. In other embodiments, any suitable combination of users may provide document 104, receive report 110, and provide feedback 112. For example, a financial advisor may provide a financial document and receive a report indicating the degree to which the financial document can be generated. Another user, such as an administrator, may also receive the report, then provide feedback validating or correcting information in the report.

User interface 106 may be a graphical user interface (GUI), a text-based user interface, and/or any other suitable type of interface through which a user may provide input. For example, in some embodiments, the user interface may be a webpage or web application accessible through an Internet browser. In some embodiments, the user interface may be a graphical user interface (GUI) of an app executing on the user's mobile device. In some embodiments, the user interface may include a number of selectable elements through which a user may interact. For example, the user interface may include dropdown lists, checkboxes, text fields, or any other suitable element.

In some embodiments computing device 108 may be configured to execute one or more NLP techniques, described herein including with respect to FIG. 1B. In some embodiments, computing device 108 may include one or more computing devices each of which may be of any suitable type. Example of such computing devices are provided herein.

In some embodiments, report 110 may include information that is indicative of the degree to which the NLG system can generate document 104. In some embodiments, the information may be displayed through plain text and/or graphical elements. The report may include bar plots, charts, graphs, text boxes, pie chart, tables, images, and/or any other suitable elements for displaying data. For example, a report may include a pie chart indicating the percentage of the document that can be generated using specific semantic objects. An example of a report is described herein including with respect to FIGS. 6B and 6C. Report 110 may be output through a graphical user interface, saved to memory, transmitted to one or more computing devices, and/or output in any other suitable way, as aspects of the technology described herein are not limited in this respect.

In some embodiments, feedback 112 may be provided by user 102 to improve future iterations of technique 100. In some embodiments, this may include feedback validating or correcting information used to generate the report. For example, the information may indicate a semantic object that can be used to generate a text segment. In some embodiments, feedback may be provided to validate or correct the semantic object and text segment pair. In other embodiments, feedback may be provided to correct document pre-processing errors. For example, the document may be processed to split text into text segments. A user may provide feedback indicating if the text is incorrectly segmented. Examples of providing feedback is described herein including with respect to FIG. 6C.

In some embodiments, user 102 may provide feedback 112 by interacting with selectable elements included in an interface. For example, a GUI may include a list of semantic object and text segment pairs. A user may interact with a dropdown menu to validate or correct the pairs. In some embodiments, the dropdown menus may include additional options for identifying document pre-processing errors. For example, the dropdown menus may include an option for incorrect text splitting.

FIG. 1B shows a technique 150 for determining the degree to which the document 104 can be generated using the NLG system. In some embodiments, technique 150 includes pre-processing the document at the document pre-processing stage 122 to generate one or more annotated representations 124. The annotated representations 124 may be used to identify a topic for the document using the document topic classifier 126. After a topic is identified for the document, the topic specific semantic object classifier 128 is used to determine the degree to which annotated representations 124 can be generated using the NLG system. Report 110 is generated using the output of the topic specific semantic object classifier 128. In some embodiments, feedback 112 is provided to improve the topic specific semantic object classifier 128.

In some embodiments, document 104 may be processed at the document pre-processing stage 122 to generate annotated representations. The pre-processing techniques may include multiple processing techniques. A first processing technique may include extracting text from the document and cleaning the extracted text. In some embodiments, extracting text from the document may include converting the document to text. In some embodiments, cleaning the text may include removing non-textual elements and removing tables. Techniques and examples related to the first processing stage are described herein including with respect to FIG. 4A (e.g., act 404 of FIG. 4A).

In some embodiments, the pre-processing techniques may additionally or alternatively include segmenting the text included in document 104 into one or more text segments. In some embodiments, a text segment may be a phrase of one or more words. In some embodiments, a text segment may be a sentence. In some embodiments a text segment may be a set of one or more sentences. For example, the text "Sales increased in 2019. Overall expenses decreased by 13%." may be split into the text segments "Sales increased in 2019." and "Overall expenses decreased by 13%." Techniques and examples related to the second processing stage are described herein including with respect to FIG. 4A (e.g., act 404 of FIG. 4A).

Additionally or alternatively the pre-processing techniques may include generating annotated representations 124 for text segments included in the document. In some embodiments, generating an annotated representation for a text segment may include tagging words in the text segment using tags. In some embodiments, a tag may be associated with a vocabulary to which the word belongs. In other embodiments, a tag may be associated with a part-of-speech of the word. For example, the word "placebo" may belong to a vocabulary related to drugs that is associated with the tag "pharma." As a result, placebo may be tagged with the tag "pharma." As another example, the word "the" may not belong to a vocabulary. As a result, it may be tagged with "det" the tag associated with its part-of-speech (e.g., determiner). Techniques for generating annotated representations are described herein including with respect to FIGS. 4B, 5A, and 5B (e.g., act 406 of FIG. 4).

In some embodiments, the document topic classifier 126 may use annotated representations 124 to identify a topic for the document. In some embodiments, the classifier may identify a topic based on tags included in the annotated representations. For example, if the document includes tags associated with vocabularies related to drugs or diseases, the document topic classifier 126 may determine that the document is related to a medical topic. In some embodiments, the document topic classifier 126 may determine a number of annotated representations that include tags related to a certain topic and compare it to the total number of annotated representations in the document. If the fraction of annotated representations that include topic-related tags exceeds a first threshold and/or the total number of annotated representations that include topic-related tags exceeds a second threshold, that topic may be identified for the document. For example, given a first threshold of 1/1,000 and a second threshold of 5, if six out of eight annotated representations include tags related to banking, a financial topic may be identified for the document.

An NLG system may be configured to generate text using semantic objects. In some embodiments, the NLG system may be configured to generate text for one or multiple topics using respective groups of semantic objects for the topics. For example, the NLG system may be configured to generate text for two topics (e.g., topic A and topic B) and may use a first group of semantic objects (e.g., group A) to generate text segments for topic A and a second group of semantic objects (e.g., group B) to generate text segments for topic B. In some embodiments, the first and second groups of semantic objects may overlap (e.g., because they share one or more semantic objects.) In other embodiments, the first and second groups of semantic objects may not overlap (e.g., because they do not have any semantic objects in common).

In some embodiments, a topic identified for the documents may be associated with one or more groups of semantic objects. A semantic object that is included in a group of semantic objects associated with a topic may be configured to generate text specific to that topic. For example, a semantic object included in a group of semantic objects associated with a finance topic may be configured to generate a text segment specific to a financial report, such as "profits increased by $500." Examples of semantic objects are described herein including with respect to FIG. 2.

In some embodiments, each of one or more semantic objects may be associated with one or more annotated representations of text segments that can be generated using the semantic object. For example, a first semantic object may be associated with multiple annotated representations generated for text segments that the first semantic object is configured to generate. In some embodiments, each of one or more semantic objects may belong to one or more groups of semantic objects that are associated with one or more topics. For example, a semantic object configured to generate the text segment "five patients received a placebo" may belong to a group associated with a pharmaceutical topic and a group associated with a medical topic. Groups of semantic objects are further described herein including with respect to FIG. 3.

In some embodiments, the topic specific semantic object classifier 128 may use the semantic objects and/or associated annotated representations to determine the degree to which the text segments in document 104 can be generated using the NLG system. This may include using one or more groups of semantic objects that are associated with the topic identified using the document topic classifier 126. In some embodiments, this may further include obtaining annotated representations associated with the obtained semantic objects. For example, if a pharmaceutical topic is identified using the document topic classifier 126, then a group of semantic objects associated with the pharmaceutical topic may be obtained, along with annotated representations associated with each of one or more of the semantic objects in the group.

In some embodiments, determining the degree to which a text segment from document 104 can be generated using the NLG system may include comparing the annotated representation of the text segment to annotated representations associated with each of one or more semantic objects. In some embodiments, this may include comparing annotated representations to determine measures of similarities. In some embodiments, determining a measure of similarity between annotated representations may include determining a Levenshtein distance, cosine similarity, and/or determining a measure of similarity in any other way. An example of determining a measure of similarity is described with respect to FIG. 8B In some embodiments, the semantic object that is associated with the annotated representation that yields the highest measure of similarity may be identified for the text segment being evaluated. The highest measure of similarity may then be output as the degree to which the text segment can be generated using the NLG system. For example, a first text segment is compared to annotated representation A that is associated with semantic object A and yields a measure of similarity of 60%. The first text segment is then compared to annotated representation B associated with semantic object B and yields a measure of similarity of 20%. semantic object A would be identified for the first text segment since it yields a higher measure of similarity. Additionally, according to this example, 60% would be output as the degree to which the first text segment can be generated using the semantic objects. In some embodiments, the techniques described herein including with respect to the topic specific semantic object classifier 128 may be repeated for each of one or more of the annotated representations 124 to determine a degree to which the document 104 can be generated.

Report 110 may be output after the topic specific semantic object classifier 128 has been used. As described herein including with respect to FIG. 1A, the report 110 may include information indicative of the degree to which the document 104 and specific text segments included in the document can be generated using the NLG system.

As described herein including with respect to FIG. 1A, feedback 112 may be provided based on the report 110. In some embodiments, the feedback may confirm that a text segment can be generated by the identified semantic object. For example, the report 110 may output that Semantic Object A can be used to generate Text Segment A in the document 104. A user may provide feedback 112 confirming that Semantic Object A can be used to generate Text Segment A.

As a nonlimiting example of technique 150, consider a financial advisor who wishes to determine the degree to which an existing financial report can be generated using an NLG system. The financial advisor may provide the financial report as a PDF by interacting with a GUI on a desktop computer. The document is processed to extract text, split the text into sentences, and generate annotated representations. Since the document is a financial report, many annotated representations include tags such as "indicator," which is a tag associated with a vocabulary related to financial indicators. Based on the tags included in the annotated representations, the Document Topic Classifier determines that the document is related to a financial topic. Using this information, the Topic Specific Semantic Object Classifier obtains, from a database, a subset of semantic objects used for generating text related to a finance, along with annotated representations associated with each of one or more semantic objects included in the subset. A first annotated representation generated for a first text segment in the financial report is compared to each of one or more annotated representations obtained from the database. The semantic object associated with the highest measure of similarity is identified as being capable of generating the first text segment. This is repeated for each of one or more annotated representations generated for the financial report to determine the degree to which the financial report can be generated. A report summarizing the results of the Topic Specific Semantic Object Classifier are output to the financial analyst via the GUI. The financial analyst can then provide feedback indicating confirming whether the identified semantic objects can be used to generate the text segment. This feedback is used to automatically update a database storing the semantic objects.

FIG. 2A is a diagram of an illustrative environment 200 in which an NLG system may operate, in accordance with some embodiments of the technology described herein. The environment 200 includes an NLG system 201 that may be configured by administrator 210 to perform a natural language generation task. As part of the configuration, administrator 210 may configure NLG system 201 to communicate with business data store(s) 212 to obtain business data 213, which may include data to be incorporated into natural language text generated by NLG system 201. The administrator 210 may configure NLG system 201 to perform the NLG task by specifying one or more semantic object(s) 222 and/or one or more document macro structures 220 that the NLG system 201 will utilize to generate natural language text.

In some embodiments, the natural language text (NLT) generated by NLG system 201 may be output to one or multiple destinations (e.g., one or more other devices, users, etc.). For example, as shown in FIG. 2A, NLG system 201 may generate NLT 203 using one or more of the semantic objects 222 and at least some of the business data 213 and provide the NLT 203 to publishing system 204. The publishing system 204 may include the NLT 203 into content 205 (e.g., a webpage, an electronic document, a report, a form, and/or any other suitable type of document) and may provide the content 205 to a user 208, for example, by providing content 205 to a software application program 206 (e.g., an Internet browser) executing on the computing device 207 (e.g., smartphone, laptop, desktop, or any other suitable computing device) of user 208.

As described above, in some embodiments, the NLG system 201 may obtain from business data store(s) 212, business data 213 at least some of which may be included in natural language text to be generated by the NLG system 201. In some embodiments, this may be done using database queries (e.g., SQL or MDX queries) or in any other suitable way. The business data 213 may include any suitable type(s) of data related to a business and may be numeric data (e.g., the revenues, profits, and/or losses of a business in a given period of time, etc.), alphabetic data (e.g., names of customers, employees, projects, etc.), or alphanumeric data. For example, the business data may include the values 70,000,000 and 50,000,000 and these data may be used by the NLG system to generate the text "In 2018, the revenue decreased from $70 M to $50 M". The business data 213 may be in any suitable format, as aspects of the technology described herein are not limited in this respect.

In some embodiments, NLG system 201 may be configured to perform one or multiple NLG tasks. In some embodiments, the NLG system 201 may be configured to perform an NLG task by an NLG application 202 configured to perform the NLG task. An NLG application 202 may be configured to perform one or multiple NLG tasks, as aspects of the technology described herein are not limited in this respect.

As shown in FIG. 2A, NLG application 202 has multiple components including document macro structure(s) 220, semantic object(s) 222, database interface module 224, NLG software tools 228, and semantic object—NLG software tool integration layer 226, which is referred to herein as "integration layer 226" for clarity. It should be appreciated that these components are illustrative and that, in some embodiments, an NLG application 202 may include one or more components in addition to or instead of these components.

In some embodiments, the NLG application 202 may generate natural language text by: (1) obtaining non-linguistic content from semantic object(s) 222 and business data 213 (obtained via the database interface module 224); (2) determining a macro structure for the natural language text using document macro structure(s) 220; (3) using the integration layer 226 to generate natural language text from the non-linguistic content using the macro structure and the NLG software tool 228.

In some embodiments, document macro structure(s) 220 may include information indicating the overall organization of a document to be generated. In some embodiments, each of multiple semantic objects may be used to generate a respective natural language text segment (e.g., a phrase of one or more words, a sentence, a set of multiple sentences). The document macro structure(s) 220 may include information indicating the order in which to organize natural language text generated using semantic objects.

Semantic object(s) 222 may include any suitable number of semantic objects, as aspects of the technology described herein are not limited in this respect. In some embodiments, the semantic object(s) 222 may be part of NLG application 202. In other embodiments, the semantic object(s) 222 may be stored in semantic object data store 240, which may be within NLG system 201 or external to NLG system 201. In some such embodiments, NLG application 202 may be configured to access information about semantic objects 222 using semantic object access module 223 that is configured to communicate with semantic object data store 240.

In some embodiments, database interface module 224 may be configured to access business data 213 from business data store(s) 212. This may be done in any suitable way. In some embodiments, the database interface module 224 may be configured to obtain data from (either pull data from or be provided data by) the business data store(s) 212. The data may be provided via a communication network (not shown), such as the Internet or any other suitable network, as aspects of the technology described herein are not limited in this respect.

In some embodiments, a user (e.g., administrator 210) may configure NLG application 202 to perform a particular NLG task by configuring the components 220, 222, and 224. For example, the user may provide the NLG application 202 with one or more document macro structure(s) 220 and semantic object(s) 222 (e.g., by providing one or more configuration files, for instance specified using a mark-up language, that specify the document macro structure(s) 220 and semantic object(s) 222). Additionally, when the NLG task involves generating NLT containing business data, the user may configure the NLG application 202 to obtain the business data needed from the business data store(s) 212.

In some embodiments, the integration layer 226 may be configured to employ NLG software tools 228 to generate natural language text using data contained in the document macro structure(s) 220, semantic object(s) 222, and/or data obtained using the database interface module 234.

In some embodiments, natural language text may be generated from non-linguistic data (e.g., data contained in document macro structure(s) 220, semantic object(s) 222, and/or data obtained using database interface module 234) using multiple stages of processing including, by way of example and not limitation: (1) an analysis stage; (2) a document planning stage; (3) a micro-planning stage; and a (4) surface realization stage. Accordingly, in some embodiments, the NLG software tools 228 may include software for performing the processing for the processing of these stages.

For example, as shown in FIG. 2B, NLG software tools 228 may include a document planning module 232 for performing processing for the document planning stage, a micro-planning module 234 for performing processing for the micro-planning stage, and a surface realization module 236 for performing processing for the surface realization stage. Each of the modules may include processor-executable instructions that when executed perform the functionality associated with the stage.

In some embodiments, the document planning stage of natural language generation builds an intermediate representation of the document to be generated. In some embodiments, the intermediate representation may describe the levels of the document (e.g., titles, sections, chapters, paragraphs, etc.). Additionally, the intermediate representation may describe relationships among elements of the document such as causal relationships or other rhetorical constructs. In some embodiments, the intermediate representation may comprise multiple entities, the smallest ones of which correspond to natural language segments generated from semantic objects, as described herein.

In some embodiments, the document planning stage of natural language generation, implemented by document planning module 232, may include: (1) a content determination stage during which an NLG system may obtain content to be expressed in natural language text; and (2) a document structuring stage for determining the rhetorical structure of the text to be generated during which the NLG system may generate a document plan indicating how the obtained content is to be organized for presentation in the natural language text to be generated. For example, to generate natural language text about the weather, information about the weather may be obtained in the content determination stage (e.g., information indicating the temperature and information indicating the likelihood of rain) and organized for presentation in the document structuring stage (e.g., by determining that information indicating the likelihood of rain should be presented before information indicating the temperature).

In some embodiments, the document planning stage may be implemented at least in part by using one or more semantic objects (e.g., using one or more semantic object(s) 222). In some embodiments, a semantic object includes a set of attributes and each of one or more of the attributes may be associated with a vocabulary for rendering that attribute into corresponding natural language text. During the document planning stage, the NLG system 201 may determine to generate a natural language segment (e.g., a sentence) using a particular semantic object. The particular semantic object may be used to determine the structure for the natural language segment—the segment may be structured to have content corresponding to attributes of the semantic object. The order of presentation of the content may be determined in the document planning stage and, for example, may be determined based on the document plan configuration (e.g., document plan configuration 258) part of the semantic object (e.g., semantic object 250).

For example, during the document planning stage, the NLG system 201 may determine to generate a natural language segment using semantic object 250 having attributes 252, data variables 254, vocabulary 256, and document plan configuration 258. The segment may be generated to have content corresponding to attributes 252 and data variables 254 of the semantic object. The vocabulary 256 may be used to render the attributes 252 into natural language text. The business data 213 may be used to specify values for the data variables 254 (optionally, with further analysis being performed on the values). The order in which the content corresponding to attributes 252 and data variables 254 is presented in the generated natural language segment may be specified by document plan configuration 258.

In some embodiments, the micro-planning stage of NLG, implemented by micro-planning module 234, may involve determining, based at least in part on the document plan, a syntactic structure for the text to be generated. In some embodiments, the micro-planning stage may involve building syntactic structure of the text from a document structure, which may involve choosing the vocabulary, the syntactic constructs, and the sentence boundaries. In some embodiments, the micro-planning stage may include an aggregation stage, a lexicalization stage, and a referring expression stage. The aggregation stage may involve determining boundaries between sentences. The lexical choice stage may involve choosing words to describe particular concepts to be expressed in the text to be generated (e.g., determining whether "warm" or "hot" should be used to describe a temperature of 80 degrees). In some embodiments, vocabularies for semantic objects may be used to perform the lexical choice stage for sentences generated based on semantic objects. For example, the lexical choice stage may be performed by substituting one or more of the attributes (e.g., attributes 252) specified by a semantic object (e.g., semantic object 250) with a corresponding vocabulary word (or words) from the vocabulary (e.g., vocabulary 254) for the attribute. In some embodiments, lexicalization may be performed using one or more grammars, for example, one or more abstract categorical grammars (ACGs), tree adjoining grammars (TAGs), context free grammars (CFGs), functional identification grammars (FIGS.), any other suitable grammars, and/or in any other suitable way. The referring expression stage may involve selecting expressions, for use in the text to be generated, to refer to concepts that appear more than once in the text (e.g., selecting the pronoun "it" to refer to "the weather" in a portion of the text to be generated).

In some embodiments, the surface realization stage of NLG, implemented by surface realization module 236, may involve transforming the syntactic structure of the document to be generated into text and may include a linguistic realization stage and a structural realization stage. The linguistic realization stage may involve generating actual text according to rules of syntax, morphology, and orthography, and may include putting words in order (e.g., in a manner consistent with the order of attributes in a semantic object for sentences being generated based on a semantic object), conjugating verbs, ensuring adjective-noun agreement, etc. Additional low-level rules relating to number formats, date formats, and capitalization may be applied at this stage. During the structural realization stage, the text generated in the linguistic realization stage may be output in a desired format (e.g., a PDF file, a webpage, an XML file, etc.). The above-described tasks may be performed by an NLG system sequentially in stages or in any other suitable way.

FIG. 2C is a diagram of an illustrative semantic object 250, in accordance with some embodiments of the technology described herein. As shown in FIG. 2C, semantic object 250 includes attributes 252, which includes data attributes 252a and lexical attributes 252b, data variables 254, variable metadata 255, vocabulary 256, document plan configuration 258, which includes content selection configuration 258a and document structure configuration 258b, analysis configuration 260, micro-planning configuration 262, and surface realization configuration 264.

In some embodiments, the attributes 252 of semantic object 250 contain content to be rendered as a natural language text segment. Each of the attributes represents a respective piece of information that may be included in the natural language text segment generated from the semantic object. Each semantic object attribute may be thought as containing a piece of information that will occupy a text slot in the rendered natural language segment and, for that reason, a semantic object attribute may be termed as a "text slot" herein. Thus, the attributes of a semantic object may be rendered as portions of text in the segment generated from the semantic object using the techniques described herein.

In some embodiments, in addition to information specifying content, each of one or more of the attributes may include information indicating its semantic role (e.g., a part of speech or a relationship) in the natural language segment to be generated. For example, an attribute may include information indicating that it is a predicate, a noun phrase, a verb, a modifier (e.g., an adverb or adjective), another part of speech, and/or another type of role in a linguistic formalism. As another example, in some embodiments, one or more of the attributes may include information indicating its relationship with one or more other data attributes. For example, an attribute may indicate that it is to precede, or follow, or be rendered within a threshold number of words of another attribute. As another example, an attribute may indicate that it semantically related (e.g., that it is a modifier of, like an adjective) another attribute (e.g., a noun phrase).

A semantic object attribute may be a data attribute or a lexical attribute. Indeed, as shown in FIG. 2C, attributes 252 include data attributes 252a and lexical attributes 252b. Data attributes 252a are described first; a description of lexical attributes 252b follows. In some embodiments, a data attribute contains numeric information to be rendered as text. For example, a data attribute may contain numerical values representing quantities such as business data (e.g., profit, loss, revenue, percent increase of revenue, number of employees, etc.), dates (e.g., Feb. 21, 2032), time (e.g., 12:03:00), and any other type of value to be rendered as part of natural language text.

In some embodiments, content of one or more data attributes 252a may be obtained from business data obtained from a data store (e.g., business data store(s) 212) as described with reference to FIG. 2A. To this end, the semantic object may include one or multiple data variables 254 whose values may be assigned to the data values obtained from the data store. In turn, the values of a data variables 254 may be assigned directly to the values of data attributes 252a and/or the values may be used to perform various computations (e.g., mean, variance, clustering, classification, correlation, statistical calculation, etc.) and the results of these values may be assigned to the values of data attributes 252.

In some embodiments, one or more of the data variables 254 may be associated with metadata. The metadata for data variables 254 may be part of variable metadata 255.

In some embodiments, the analysis configuration 260 specifies the analysis and/or calculations to be performed on the values of data variables. As described above, the results of such calculations may be assigned to data attributes 252a, which in turn may be rendered as natural language text.

Returning to lexical attributes 252, a lexical attribute represents, at an abstract level, a chunk of text to be rendered into a natural language segment. The abstract representation of text by a lexical attribute may be transformed into actual text by using vocabulary 256, which contains text strings (e.g., words) that may be used to realize the lexical attribute as natural language in the rendered segment.

Figure 2D:
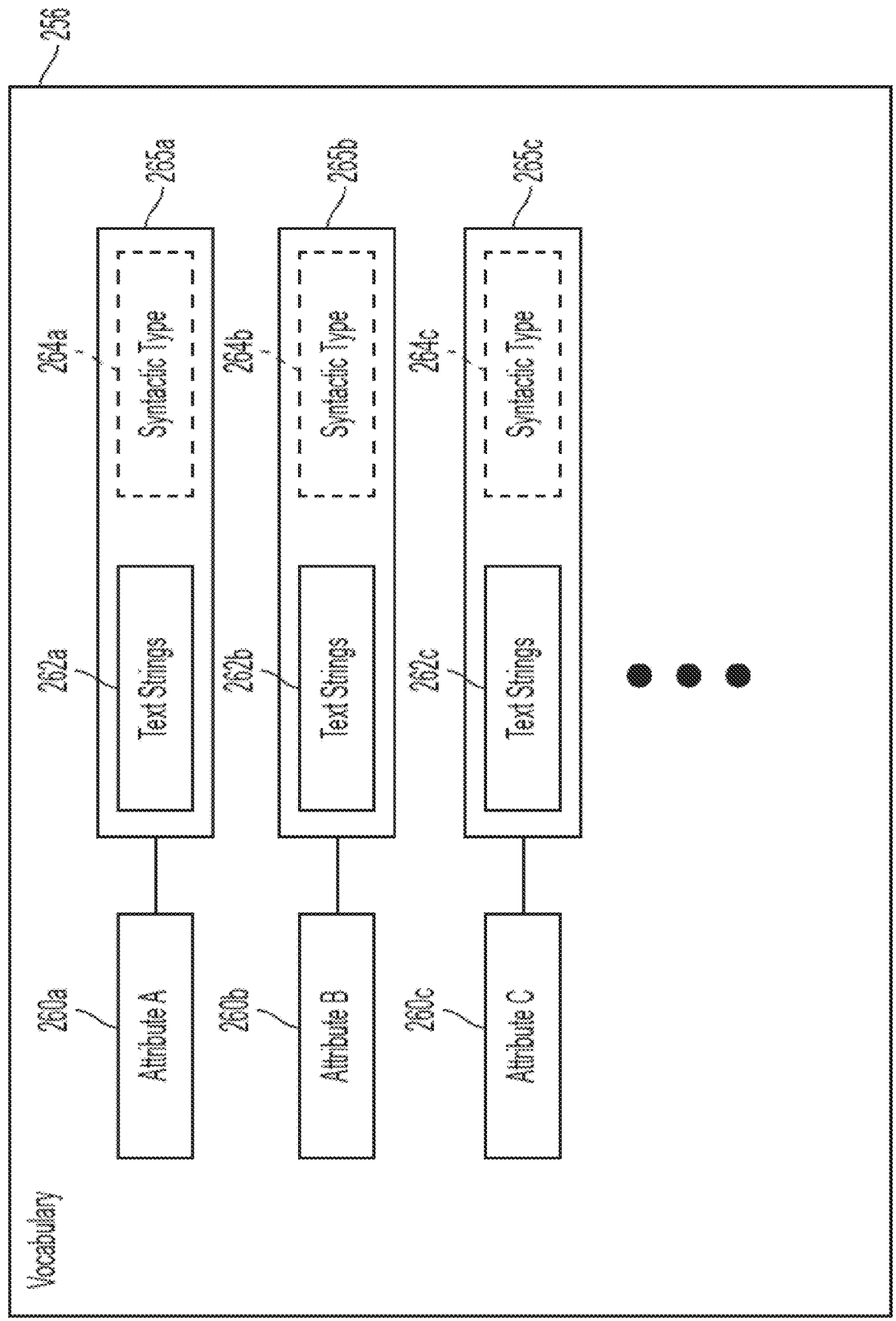
FIG. 2D is a diagram of an example vocabulary for the semantic object of FIG. 2C, in accordance with some embodiments of the technology described herein.

FIG. 2D is a diagram of an example vocabulary 256 for the semantic object 250 of FIG. 2C. As shown in FIG. 2D, vocabulary 256 includes lexical attributes A, B, C, labeled as 260a, 260b, and 260c, respectively. Attribute 260a is associated with respective metadata 265a having text stings 262a and syntactic type information 264a. Attribute 260b is associated with respective metadata 265b having text stings 262b and syntactic type information 264b. Attribute 260c is associated with respective metadata 265c having text stings 262c and syntactic type information 264c. The syntactic type information may be information indicating the part-of-speech for the text strings (e.g., noun, verb, adverb, adjective, etc.).

As shown in FIG. 2D, entries in vocabulary for a semantic object may comprise (identifier, metadata) pairs, each identifier identifying a respective lexical attribute and the metadata containing text strings and, optionally (as indicated by dashed lines in the figure), syntactic type information for the lexical attribute.

In some embodiments, the attributes 252 of a semantic object 250 may be processed through a series of stages to generate a natural language text segment. For example, in order to obtain values for the data attributes 252a, data may be obtained from one or more external sources and processed using analysis configuration 260. Next, a first intermediate representation of the semantic object may be generated using the attributes 252 and document plan configuration 258 in the document planning stage. Next, a second intermediate representation of the semantic object may be generated using the first intermediate representation, the vocabulary 256 and micro-planning configuration 262 during the microplanning stage. Finally, the natural language segment may be obtained from the second intermediate representation using the surface realization configuration 264 during the surface realization stage.

As shown in FIG. 2C, in some embodiments, the document plan configuration includes content selection configuration 258a and document structure configuration 258b. The content selection configuration 258a may indicate which ones of the attributes 252 of the semantic object are to be used in generating a natural language text segment. The configuration 258a may indicate that some or all of attributes 252 may be used.

In some embodiments, the document structure configuration 258b may include information used by the NLG system to determine how the content of the semantic attributes 252 is to be organized into the natural language text segment generated from the semantic object 250. The document structure configuration 258b may include a list of one or multiple options describing different structures for the natural language text segment generated from the semantic object 250. For example, document structure configuration 258b may include information specifying an order in which some or all of the semantic object attributes 252 are to appear in the natural language text segment, when rendered.

In some embodiments, micro-planning configuration 262 may include information to be used during the micro-planning stage of generating natural language text from semantic object 250. In some embodiments, this information may include information for controlling aggregation, word order, generating referential expressions, any information used by the software tool(s) of NLG software tools 228 used to perform micro-planning, and/or any other suitable information used to control the manner in which micro-planning is performed.

In some embodiments, surface realization configuration 264 may include information to be used during the surface realization stage of generating natural language text from semantic object 250. In some embodiments, this information may include information for specifying formats of numbers, dates, capitalization, any information used by the software tool(s) of NLG software tools 228 used to perform surface realization, and/or any other suitable information used to control the manner in which surface realization is performed.

Figure 3:
FIG. 3 is a diagram of illustrative subsets of semantic objects, in accordance with some embodiments of the technology described herein.

As described herein including with respect to FIG. 1B, the techniques may include accessing specific subsets of semantic objects for determining the degree to which text segments can be generated using the NLG system. FIG. 3 is a diagram of illustrative subsets of semantic objects, in accordance with some embodiments of the technology described herein.

As shown in FIG. 3, semantic objects 302 includes all semantic objects, including three subsets of semantic objects 304, 306, and 308. Subset A 304 includes semantic objects associated with Topic A, Subset B 306 includes semantic objects associated with Topic B, and Subset C 308 includes semantic objects associated with Topic C. As described above, semantic objects associated with a topic may be configured to generate sentences related to that topic (e.g., specific vocabulary and/or formatting). For example, semantic objects associated with the topic "finance" may be configured to generate text segments including vocabulary such as "balance" and "fiscal," in the format of a typical financial report.

In some embodiments, the subsets may include one or more semantic objects that are also included in other subsets. As shown, Subset B 306 overlaps Subset C 308, indicating that they share one or more semantic objects. Consider, as an example, a topic related to pharmaceutical drugs (e.g., Topic B 306) and a topic related to diseases (e.g., Topic C 308). A semantic object may be configured to generate text that includes vocabulary and sentence structure relevant to both pharmaceutical drugs and diseases. For example, the semantic object may be configured to generate text segments suitable for a medical report that include vocabulary such as "chemotherapy" and "lymphoma." As such, this semantic object may be included in both subsets associated with both topics.

In other embodiments, a subset of semantic objects may not share any semantic objects with other subsets, as shown by Subset A 304, which does not overlap either Subset B 306 or Subset C 308. Consider the example where Topic B is related to pharmaceutical drugs, Topic C is related to diseases, and Topic A is related to finance. The subset (e.g., Subset A 304) associated with the finance topic may include semantic objects configured to generate text for a financial report that includes vocabulary related to finance. None of the semantic objects included in this subset may be suitable for generating text related to pharmaceutical drugs or diseases. As such, Subset A 304 may not include any of the semantic objects 302 included in Subset B 306 or Subset C 308.

In some embodiments, one or more subsets of semantic objects 302 may be used to determine the degree to which text segments can be generated using the NLG system and the selected subsets of semantic objects. As described above, the subsets may be selected based on a topic identified for the document. In some embodiments, one, some, most, or all subsets may be selected and used. For example, if a "pharmaceutical" topic is identified for the document, a subset of semantic objects associated with a pharmaceutical drug topic and a subset of semantic objects associated with a disease topic may be selected. As another example, if a "finance" topic is identified for the document, a subset associated with a finance topic may be selected. Alternatively, in some embodiments, all subsets may be selected. For example, for a financial report generated for a hospital, all three example subsets (e.g., pharmaceutical drugs, diseases, and finance) may be selected. In some embodiments, including all of the subsets of semantic objects may be equivalent to including all of the semantic objects 302 accessible to or included in the system.

Figure 4A:
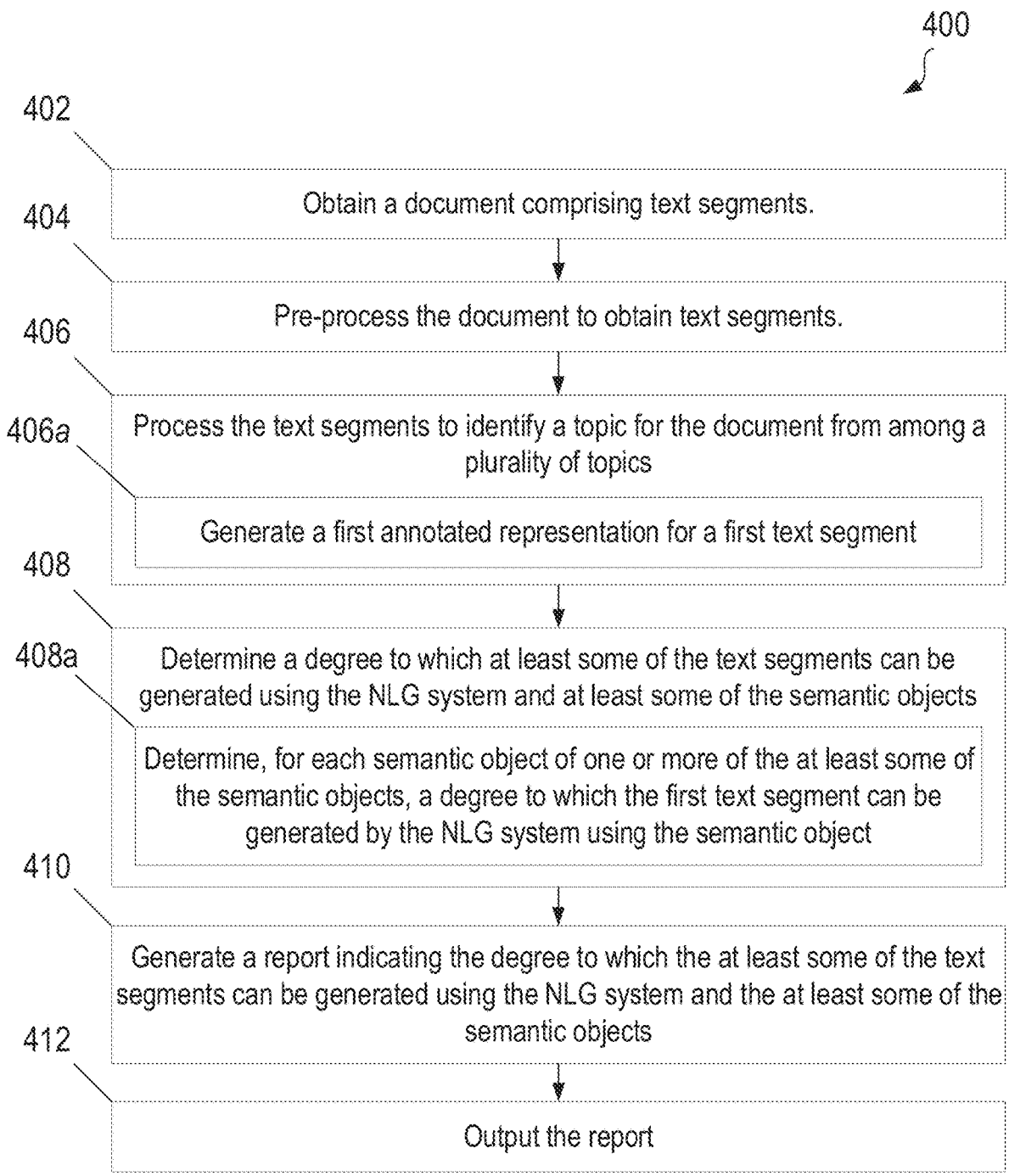
FIG. 4A is a flowchart of an illustrative process 400 for determining a degree to which a document can be generated using an NLG system, in accordance with some embodiments of the technology described herein.

FIG. 4A is a flowchart of an illustrative process 400 for determining a degree to which a document can be generated using an NLG system, in accordance with some embodiments of the technology described herein. Process 400 may be performed by any suitable computing device(s). For example, process 400 may be performed by a laptop computer, a desktop computer, one or more servers, in a cloud computing environment, computing device 900 as described herein including with respect to FIG. 9, and/or in any other suitable way.

Process 400 begins at act 402, where a document comprising text segments is obtained. In some embodiments, the document may be obtained through a web-based interface. For example, the user may interact with the web-based interface to specify the document to be analyzed, and the document is then uploaded for analysis from the user's computing device. The document may be in any suitable format (e.g., PDF, plain text, HTML, CSV, etc.), as aspects of the technology described herein are not limited by the format of the document obtained at act 402. The document may be of any suitable length and may include any suitable number of words, phrases, and/or sentences. The document may include natural language text, symbols (e.g., "$", "%", etc.), markup (e.g., "% gt" ">", etc.), tables, and/or non-ASCII characters (e.g., bullet points). Examples of different types of documents are provided herein.

After the document is obtained at act 402, process 400 proceeds to act 404, where the document is pre-processed. In some embodiments, the document may be pre-processed in one or multiple stages. If the document is not a text file, pre-processing the document may include extracting text from the document. For example, if the document is in a PDF format, any suitable converter (e.g., pdfminer, Apache Tika®, etc.) may be used to extract text from the document.

Additionally or alternatively pre-processing may include cleaning the text. In some embodiments, cleaning the text may include removing any non-textual elements (e.g., data tables) from the text. Removing non-textual elements may include selecting sentences that contain a specified percentage (e.g., 30%, 40%, 50%, 60%, etc.) of plain text and removing the remaining sentences. In some embodiments, non-textual elements may exclude numerical data and/or telephone numbers.

Additionally or alternatively, pre-processing may include normalizing the text. In some embodiments, normalizing the text may include normalizing characters (e.g., changing curly quotes to straight quotes) and/or normalizing acronyms (e.g., changing U.S. to US). Normalizing the text may include transforming markup (e.g., ">", ">"). Further, normalizing the text may include removing non-ASCII characters (e.g., bullet points).

Additionally or alternatively, pre-processing may include splitting the text into text segments. In some embodiments, this may include splitting the text at specified boundary parameters (e.g., ".", "!", "T", etc.) As described herein, text segments may include a phrase of one or more words, a sentence and/or a set of multiple sentences.

After the document is pre-processed at act 404, process 400 proceeds to act 406, where the text segments are processed to identify a topic for the document from among a plurality of topics. Examples of topics are provided herein. In some embodiments, processing the text segments includes act 406a for generating a first annotated representation for a first text segment. In some embodiments, act 406a is repeated for one, some, most, and/or all of the text segments in the document. As described herein, generating an annotated representation may include tagging one or more words and/or phrases in a text segment using one or more tags. Techniques for generating an annotated representation are described herein including with respect to FIG. 4B.

After annotated representations have been generated for the text segments, the tags included in the annotated representations may be used to identify a topic for the document. In some embodiments, one or more specific tags may be associated with a topic. For example, the tag "pharma" may be associated with a pharmaceutical topic. Identifying a topic for the document may include determining the number of annotated representations that include specific tags (e.g., "pharma"). First, the number of annotated representations that include the specific tags may be compared to a first threshold (e.g., 2, 3, 4, 5, 6 7, 8, etc.). Second, the ratio of the number of annotated representations that include the specific tags to the total number of annotated representations may be compared to a second threshold (e.g., 0.0001, 0.0005, 0.001, 0.005, 0.01, etc.). In some embodiments, if both the first and second thresholds are exceeded, the topic associated with the specific tags is identified for the document. In this case, if neither or only one of the thresholds are exceeded, then a different topic is identified for the document. In some embodiments, if either the first or the second thresholds are exceeded, the topic associated with the specific tags is identified for the document. In this case, if neither threshold is exceeded then a different topic is identified for the document.

In some embodiments, identifying a different topic for the document may include repeating act 406 for a different topic. This may include determining the number of annotated representations that include specific tags associated with a different topic (e.g., finance). In other embodiments, identifying a different topic for the document includes automatically identifying a different topic. For example, if the first topic is not identified for the document, then a second topic is automatically identified.

After a topic is identified for the document at act 406, process 400 proceeds to act 408 for determining a degree to which at least some of the text segments can be generated using the NLG system and at least some of the semantic objects. In some embodiments, this includes accessing one or more subsets of semantic objects that are associated with the topic identified at act 406. For example, a subset that includes semantic objects that are configured to generate text for a financial report may be accessed when a finance topic is identified at act 406. Act 408 includes act 408a for determining, for each semantic object of one or more of the at least some of semantic objects, the degree to which a first text segment can be generated by the NLG system using the semantic object. For example, this may include determining the degree to which the first text segment can be generated using semantic objects included in a subset of semantic objects. In some embodiments, act 408a is repeated for at least some of the text segments in the document. Techniques for determining the degree to which a text segment can be generated using the semantic objects are described herein including with respect to FIG. 4C.

Next, process 400 proceeds to act 410, where a report is generated indicating the degree to which at least some of the text segments can be generated using the NLG system and the at least some of the semantic objects. In some embodiments, generating the report may include determining the degree to which the document can be generated based on the degree to which the text segments can be generated. In some embodiments, the report may identify semantic objects that that were identified for specific text segments in the document, as a result of act 408. The report may be in any suitable format (e.g., a PDF file, an HTML file, a webpage, an XML file, a plain text file, etc.), as aspects of the technology described herein are not limited by the type of format of the report. The report may be of any suitable length and may include any suitable number of words, phrases, and/or sentences. Further, the report may include graphical elements, such as tables, charts, images, and/or graphs.

At act 412, the generated report is output. The report may be output through a graphical user interface, saved to memory, transmitted to one or more other computing devices, and/or output in any other suitable way.

FIG. 4B is a flowchart of an example implementation of act 406a, for generating a first annotated representation of a first text segment, beginning at act 422.

Act 422 includes determining whether a word in the first text segment is included in a first vocabulary of a plurality of vocabularies, associated with a first tag of a plurality of tags. Examples of vocabularies and their associated tags are listed in Table 1. At act 424, the word in the first text segment is tagged with a first tag when it is determined that the word is included in the first vocabulary. For example, if the word in the first text segment is "nausea," and "nausea" is included in a vocabulary that is associated with the tag "disease," then "nausea" may be tagged using the tag "disease." However, when it is determined that the word in the first text is not included in any of the vocabularies at act 426, then a part-of-speech is determined for the word, and the word may be tagged using the tag associated with the part of speech. For example, if the word in the first text segment is "company," and it is determined that "company" is not included in the vocabularies, then "company" is tagged using the tag "noun," which is associated with its part-of-speech.

In some embodiments, act 406a may be implemented for each of one or more words and/or phrases included in the first text segment to generate an annotated representation of that text segment. In some embodiments, act 406a may be implemented for one, some, most, or all of the text segments in the document. As a result, an annotated representation will be generated for each of those text segments.

Figure 4C:
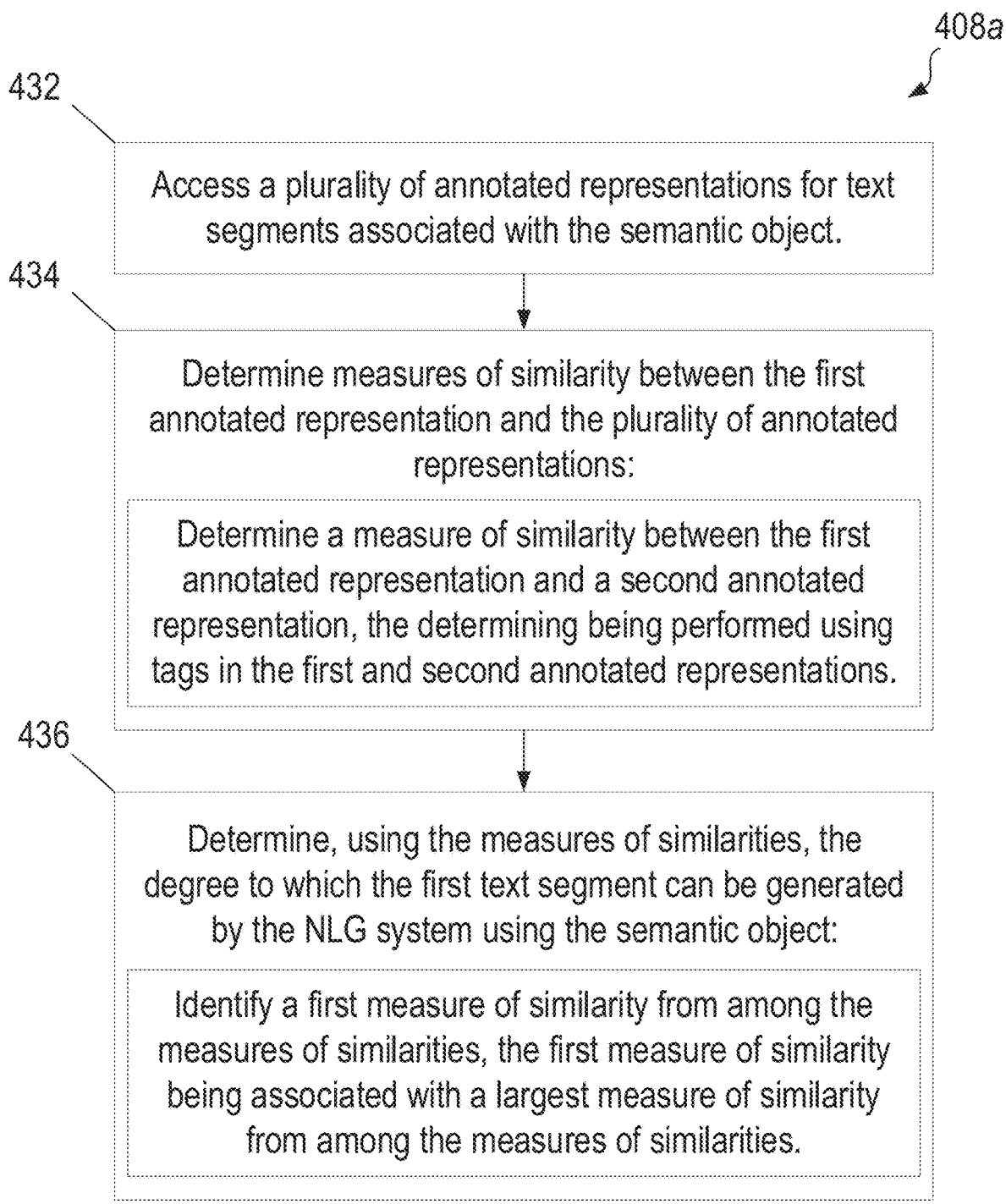
FIG. 4C is a flowchart illustrating an example implementation of act 408a of process 400 shown in FIG. 4A, in accordance with some embodiments of the technology described herein.

FIG. 4C is a flowchart of an example implementation of act 408a, for determining, for each semantic object of one or more of the at least some of the semantic objects, the degree to which the first text segment can be generated using the semantic object.

The flowchart begins at act 432 for accessing a plurality of annotated representations of text segments associated with the semantic object. As described above, each of one or more semantic objects may be associated with text segments that can be and/or have been generated using the semantic object. For example, a semantic object may be used to generate the text segments: "costs increase in 2019" and "benefits declined during the same period." Using the techniques described herein including with respect to FIGS. 4B, annotated representations are generated for each of one or more text segments associated with a semantic object. As a result, a semantic object may be associated with one or more annotated representations.

Once the annotated representations are accessed at act 432, they may be used at act 434 to determine measures of similarities between the first annotated representation generated for a text segment of the document and the plurality of annotated representations that are generated for text segments associated with the semantic object. In some embodiments, act 434 includes determining a first measure of similarity between the first annotated representation associated with the document and a second annotated representation that is associated with the semantic object. This may be performed by using the tags in the first and second annotated representations. For example, the cosine similarity and/or Levenshtein distance may be computed, using the tags, to determine a measure of similarity between the first annotated representation associated with the document and the second annotated representation associated with the semantic object. This may be repeated to determine measures of similarity between the first annotated representation and each of the remaining annotated representations associated with the semantic object.

At act 436, the measures of similarities are used to determine the degree to which the first text segment can be generated by the NLG system using the semantic object.

Several measures of similarities could be determined for a single semantic object since the semantic object could be associated with more than one annotated representation. As a result, act 436 may include identifying a first measure of similarity from among the measures of similarities that is associated with the largest measure of similarity from among the measures of similarities. The identified measure of similarity may be indicative of the degree to which the first text segment can be generated by the NLG system using the semantic object.

In some embodiments, act 406b may be repeated for each of one or more semantic objects to determine the degree to which each of the one or more semantic objects could be used to generate the first text segment. In some embodiments, the largest degree, from among the degrees determined for the semantic objects, may identified. The largest degree may indicative of the degree to which the first text segment can be generated using the NLG system. In some embodiments, the largest degree and the semantic object associated with the largest degree may be output in a report. In some embodiments, if the largest degree exceeds a specified threshold (e.g., 20%, 40%, 60%, etc.), it may indicate that the semantic object can be used to generate the first text segment, at least to some degree. If the largest degree does not exceed the threshold, it may indicate that the semantic object (and the NLG system) cannot be used to generate the text segment without further configuration.

Figure 5A:
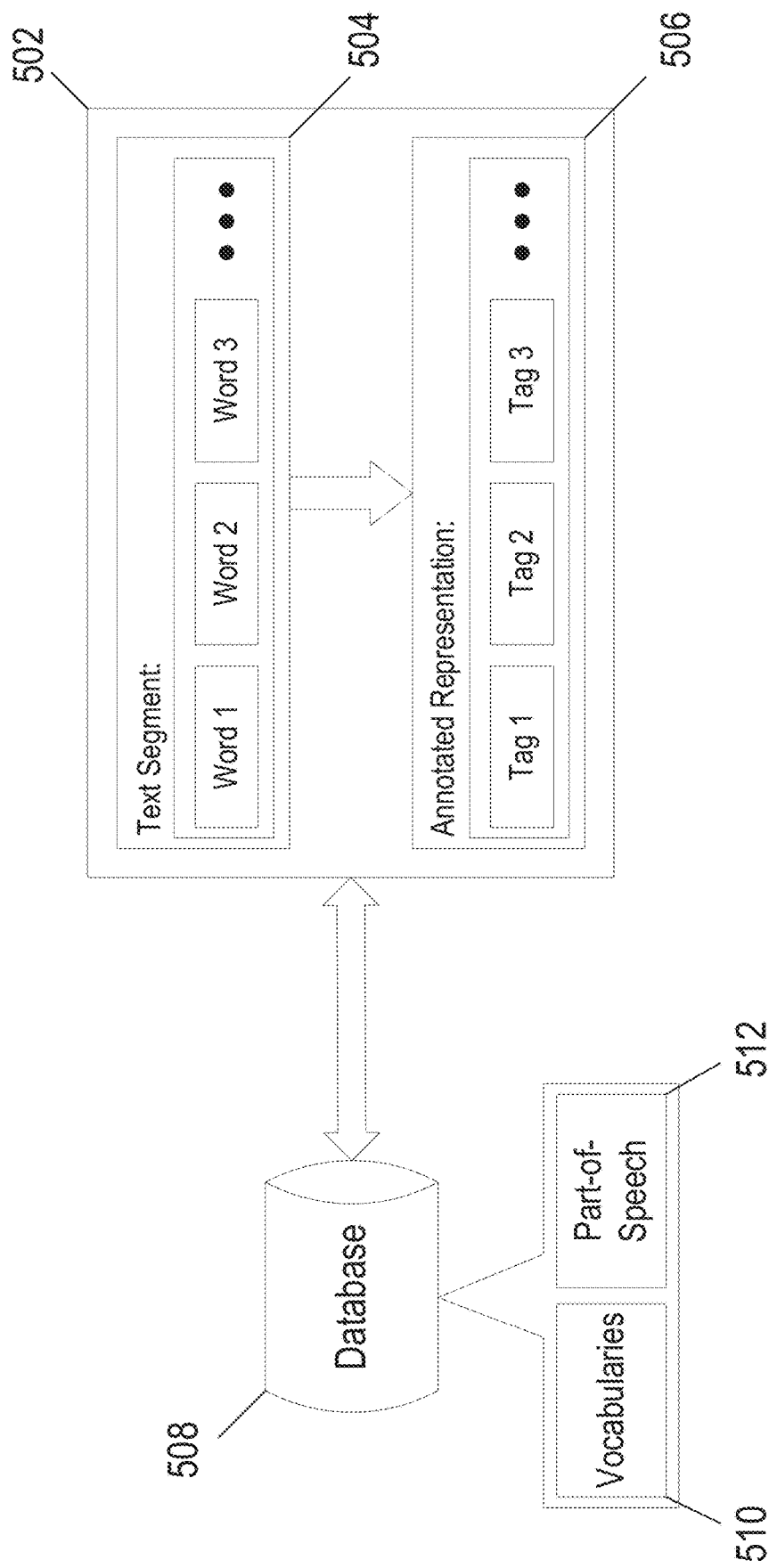
FIG. 5A is a diagram of an illustrative technique for generating an annotated representation of a text segment, in accordance with some embodiment of the technology described herein.

In some embodiments, the techniques described herein include tagging words or phrases in a text segment to generate an annotated representation. FIG. 5A is a diagram of an illustrative technique for generating an annotated representation 506 of a text segment 504, in accordance with some embodiment of the technology described herein.

An annotated representation 506 may include tags (e.g., Tag 1, Tag 2, Tag 3) used for tagging words or phrases (e.g., Word 1, Word 2, Word 3) in the text segment 504. In some embodiments, tagging a word may include identifying a vocabulary, from among vocabularies 510, that the word belongs to, and using the tag (e.g., Tag 1, Tag 2, Tag 3) associated with the identified vocabulary. For example, the word "placebo" may be included in a vocabulary associated with the tag "pharma." As a result, "pharma" would be used to tag the word "placebo."

In some embodiments, vocabularies may be stored in database 508, which may be accessed by the system 502 where the tagging occurs. Table 1 includes a non-exhaustive list of example tags, descriptions of the vocabularies associated with those tags, and example words, symbols and phrases included in those vocabularies. In some embodiments, existing tagging algorithms may be used to tag certain words, phrases, or symbols belonging to a specific vocabulary. For example, SpaCy's Named-entity Recognition algorithm (Honnibal, et al., "SpaCy: Industrial-strength Natural Language Processing in Python," 2020, Zenodo, doi:10.5281/zenodo.1212303) may be used to tag dates (e.g., Oct. 5, 2013) with the tag "date".

In some embodiments, a word (e.g., Word 1, Word 2, Word 3) may not be included in any of the vocabularies 510. In this case, tagging the word may include determining a part-of-speech 512 for the word and using a tag (e.g., Tag 1, Tag 2, Tag 3) associated with the part-of-speech. For example, the word "company" may not be included in any of the vocabularies included in the system. As a result, "company" is tagged with "noun," the tag associated with its part-of-speech. The part-of-speech of a word may be determined in any suitable way. For example, a part-of-speech tagger may be used to determine the part-of-speech and identify the appropriate tag for the word. In some embodiments, the part-of-speech tags may be Universal part-of-speech tags, listed in Table 2. An existing part-of-speech tagging algorithm, such as SpaCy's POS-tagger (Honnibal, et al., "SpaCy: Industrial-strength Natural Language Processing in Python," 2020, Zenodo, doi:10.5281/zenodo.1212303) may be used to tag words with a corresponding part-of-speech.

Figure 5B:
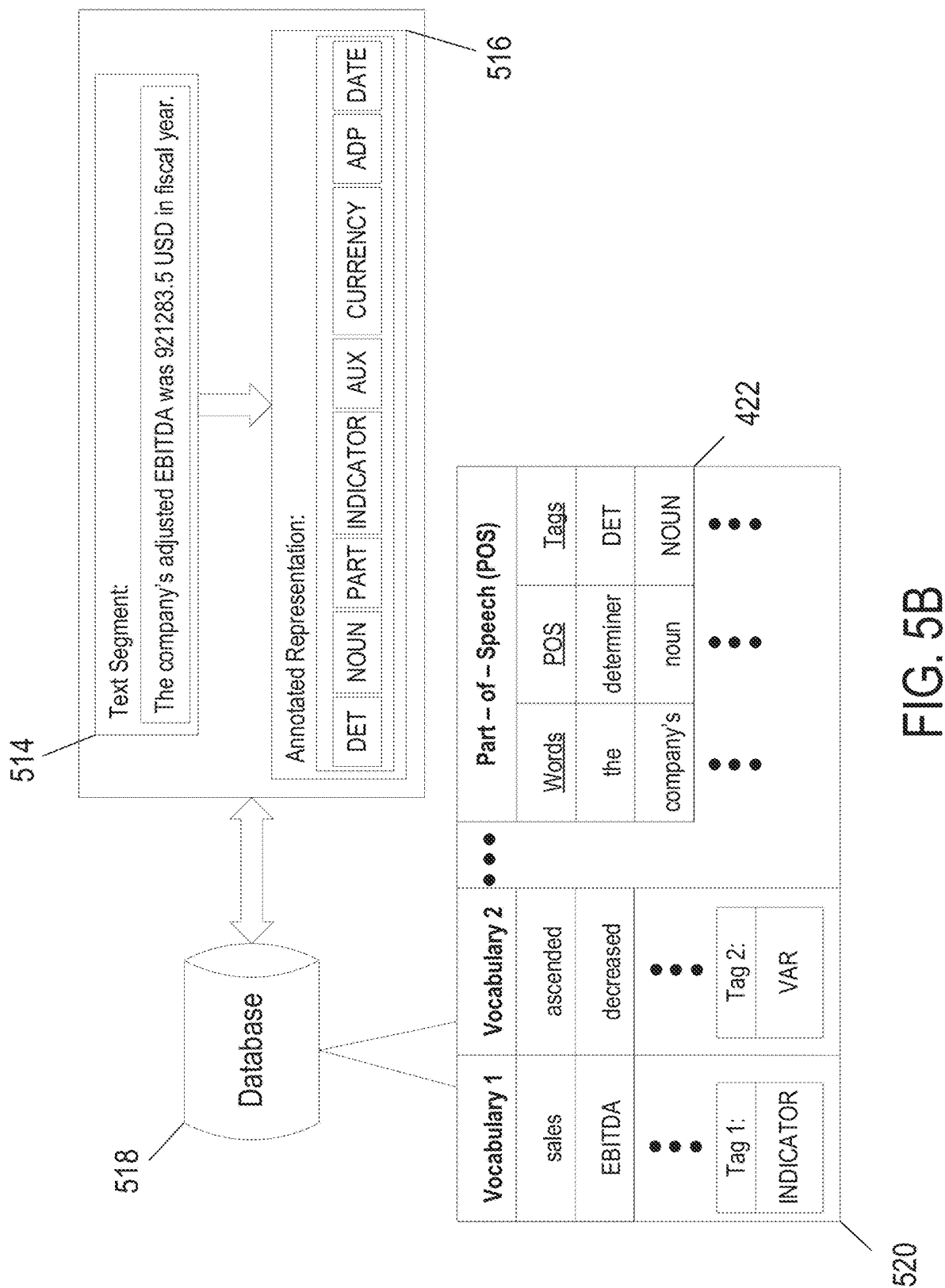
FIG. 5B is diagram of an example technique for generating an annotated representation of a text segment, in accordance with some embodiments of the technology described herein.

FIG. 5B shows an example of the technique for generating the annotated representation 516 of a text segment 514. As shown, text segment 514 includes the words and phrases: "the," "company's," "adjusted," "EBITDA," "was," 921283.5 USD," "in," "fiscal year." For each word or phrase, a tag is identified based on vocabularies 520 or part-of-speech 522.

The first word, "the," is not included in vocabularies 520. Therefore, it is tagged (e.g., using the tag "DET") based on its part-of-speech (e.g., determiner). Similarly, the words "company" and "adjusted" are not included in vocabularies 520. As a result, they are tagged (e.g., using tags "NOUN" and "PART") based on their parts-of-speech (e.g., noun and participle). The abbreviation "EBITDA" is included in vocabularies 520, as shown in Vocabulary 1. Therefore, "EBITDA" is tagged using the tag associated with Vocabulary 1 (e.g., INDICATOR). The word "was" is tagged (e.g., using the tag "AUX") based on its part-of-speech (e.g., auxiliary). The phrase "921283.5 USD" is tagged with the tag "CURRENCY" associated with a vocabulary that includes numerical data and a currency name. The word "is" is tagged (e.g., using the tag "ADP") based on its part-of-speech (e.g., adposition). The final phrase "fiscal year" is included in a vocabulary related to dates and is thus tagged using the associated tag "DATE."

Additional examples of text segments and their associated annotated representations are included in Table 3.

TABLE 1

Example tags and vocabularies used for tagging text segments.

| Tag | Vocabulary Description | Examples |
|---|---|---|
| CURRENCY | Currency names and/or symbols, numerical data. | 35.02 USD, 1 Euro, 27 € |
| PERCENT | Percentages, numeric followed by "%" | 25%, 99.9% |
| DATE | Absolute or relative dates or periods | Oct. 10, 2007, fiscal year, Sep. 5, 2014 |
| GEO | Geographical names and corresponding adjectives. | France, French, America, American |
| PHARMA | Words or phrases that are typical of medical reports. | Placebo, adverse event |
| DISEASE | Disease names from ICD and MedDRA taxonomies. | Parkinson disease, Cerebral palsy, nausea |
| INDICATOR | Financial indicators as extracted from financial reports. | EBITDA, sales |
| IHEAD | Financial indicator head nouns | Assets, balance |
| VAR | Specific verbs and nouns related to variation. | Increased, decreased, ascended |
| DESCRIPTION | Specific verbs and nouns related to description. | Reported, achieve, record |
| CONTRIBUTION | Specific verbs and nouns related to contributions. | Earn, receive, contribute |
| CAUSALITY | Specific connectors related to causality. | Despite, due to, based on |

TABLE 2

Universal part-of-speech tags.

| Tag | Part-of-Speech |
|---|---|
| ADJ | Adjective |
| ADP | Adposition |
| ADV | Adverb |
| AUX | Auxiliary |
| CCONJ | Coordinating conjunction |
| DET | Determiner |
| INTJ | Interjection |
| NOUN | Noun |
| NUM | Numeral |
| PART | Particle |
| PRON | Pronoun |
| PROPN | Proper noun |
| PUNCT | Punctuation |
| SCONJ | Subordinating conjunction |
| SYM | Symbol |
| VERB | Verb |
| X | Other |

TABLE 3

Example text segments and associated annotated representations.

| Text Segment | Annotated Representation |
|---|---|
| Sales ascended (34.21%) to 5263 USD in fiscal year from 8000 in fiscal year. | INDICATOR, VAR, CURRENCY, ADP, CURRENCY, ADP, DATE, ADP, CURRENCY, ADP, DATE |
| The most frequently reported SOC in the total FAS population was nausea. | DET, ADV, ADV, DESCRIPTION, NOUN, ADP, DET, ADJ, PROPN, NOUN, AUX, DISEASE |

FIG. 6A shows an example of a graphical user interface (GUI) for obtaining a document comprising text segments, in accordance with some embodiments of the technology described herein. The example includes a region, as indicated by the dashed lines, where a user can upload a document. The user can either drag and drop their files or select within the region for more upload options. The GUI also includes information about the system that may provide context or instructions for a user.

FIG. 6B shows a portion of an example report including information indicative of a degree to which one or more regions of a document can be generated using the NLG system configured with semantic objects, in accordance with some embodiments of the technology described herein. For the purpose of the following examples (e.g., FIGS. 6B-C), a semantic object may also be referred to as an "intention."

In some embodiments, generating the report may include determining a "coverage," which may be indicative of the fraction (or percentage) of the document that can automatically be generated using the NLG system and semantic objects. As shown in this example, this portion of the report includes an "Intention Coverage." This may be indicative of the percentage of the text segments that can be generated using the semantic objects and NLG system. For example, the coverage may be the ratio between the number of text segments that can be generated and the total number of text segments in the document.

In some embodiments, the report may include a confidence index associated with a text segment and the semantic object associated with that text segment. The confidence index may depend on (A) the degree to which that the semantic object can generate the text segment and (B) the number of annotated representations associated with the semantic object. The confidence index may be indicative of the confidence that the identified semantic object is able to generate the respective text segment. For example, a semantic object associated with 5000 annotated representations that results in a 60% match (e.g., degree) for the text segment may be predicted with a higher confidence than a semantic object associated with 120 annotated representations that results in a 40% match. In some embodiments, the confidence index may include different ranges for classifying a prediction as more or less confident (e.g., 0-20%, 20-40%, 60-80%, 80-100%). In this example, the report includes a "Confidence Index" that represents the overall confidence for the document. As shown, the example Confidence Index is four out of five stars.

The example portion of the report further includes a raw count of specific semantic objects identified for text segments in the document. The coverage indicates the number of text segments for which each has been identified. For example, the semantic object "customIntention" may be used to generate 185 of the text segments in the document. Further, the pie chart displays the percentage of text segments that can be generated by each of the listed intentions. For example, as shown, "customIntention" can be used to generate 31% of the text segments in the document.

The report coverage outline includes a plot that represents the distribution of text segments in the document that can be automatically generated. The horizontal axis represents text segments over the length of the report, while the vertical axis represents the confidence with which they can be generated using the identified semantic objects. This type of display may help a user to quickly identify portions of the document that can and cannot be automated.

Sample extracts of text in the document may be included in the example report to highlight text segments that can and cannot be automatically generated using the NLG system and semantic objects. This may help the user to focus on the sections of the report that need further attention and configuration of the NLG system.

FIG. 6C shows an example portion of a GUI that includes selectable elements through which a user can provide input to associate semantic objects with text segments, in accordance with some embodiments of the technology described herein. In some embodiments, this portion of a report may be accessible to any users or limited to specific users.

In some embodiments, this portion of the report may enable a user to view, text segment by text segment, the identified semantic objects. As shown, this example includes drop-down menus that allow the user to validate or correct the results by identifying the correct semantic object for the text segment. Additionally, the drop-down menu includes options regarding the processing of each text segment. For example, if the text was supposed to be segmented into sentences, but a text segment is displayed as a phrase, the user may select "Wrong segmentation" in the drop-down menu. Additionally, this example portion provides the degree to which the text segment can be generated (e.g., score).

Figure 7:
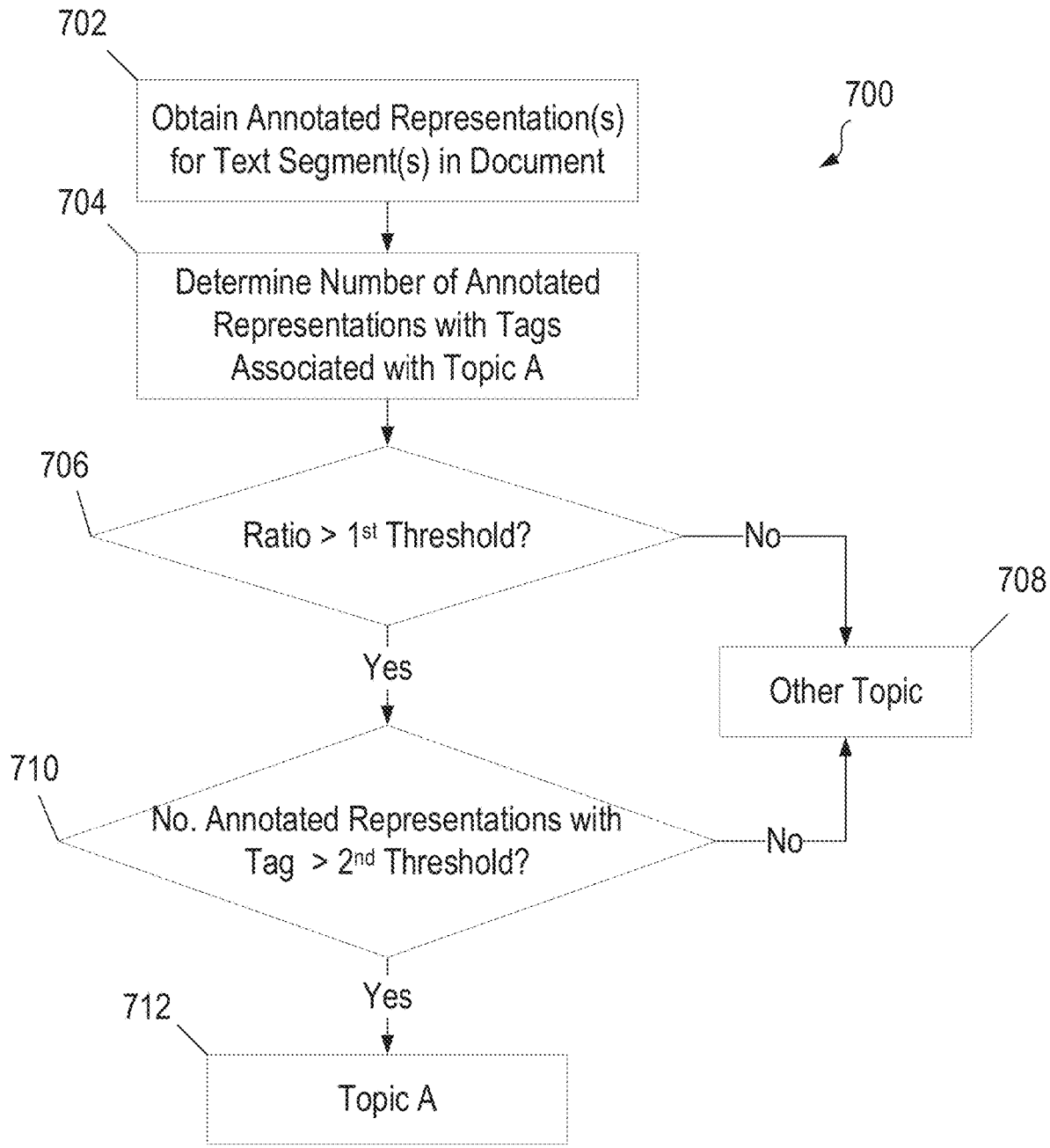
FIG. 7 is an example flowchart of process 700 for identifying a topic for the document, in accordance with some embodiments of the technology described herein.

FIG. 7 is an example flowchart of process 700 for identifying a topic for the document, in accordance with some embodiments of the technology described herein. Process 700 is used to determine whether a document is related to Topic A, or to a different topic. Topic A may be any suitable topic. Example of topics are described herein.

For example, Topic A may be a finance topic, a pharmaceutical topic, an agricultural topic, an entertainment topic, or any other suitable topic.

Process 700 begins at act 702 for obtaining annotated representations of text segments in a document. In some embodiments, this may include obtaining annotated representations that were previously generated for the text segments. In some embodiments, this may include generating annotated representations for the text segments according to the techniques described herein including with respect to FIG. 4B.

Once annotated representations have been generated, process 700 proceeds to act 704 for determining the number of annotated representations that include at least one tag associated with Topic A. An annotated representation that includes a tag associated with Topic A may indicate that the text segment includes words or phrases relating to Topic A. If the document contains a certain number of words or phrases related to Topic A, it may be probable that the topic of the document is related to Topic A.

At act 706, a ratio is calculated between the number annotated representations that contain at least one tag associated with Topic A and the total number of annotated representations for the document. That ratio is indicative of the fraction of text segments in the document that includes at least one word related to Topic A. The ratio is then compared to a first threshold. In some embodiments, the first threshold may be greater than 0.00001, 0.0005, 0.001, 0.0015, 0.002, or 0.005. If the ratio does not exceed the specified threshold, then another topic 708 be identified for the document.

At act 710, the total number of annotated representations that include the tag associated with Topic A may be compared to a second threshold. In some embodiments, the second threshold may be greater than 1, 2, 3, 4, 5, 6, 7, 8, 9, or 10 annotated representations. If the number of annotated representations does not exceed the specified threshold, then another topic 708 may be identified for the document. If the number of annotated representations does exceed the second threshold, then the pharma topic 712 is identified for the document.

In some embodiments, the other topic 708 may be automatically identified as the topic for the document. This may occur if there are only a few topics. For example, if Topic A and Topic B are the only two options for the document, then the other topic 708 may be Topic B.

In some embodiments, process 700 may be repeated if act 706 or act 710 results in the other topic 708. For example, process 700 may be repeated for Topic B, rather than topic A. In this example, act 704 may include determining the number of annotated representations with tags associated with Topic B.

Figure 8A:
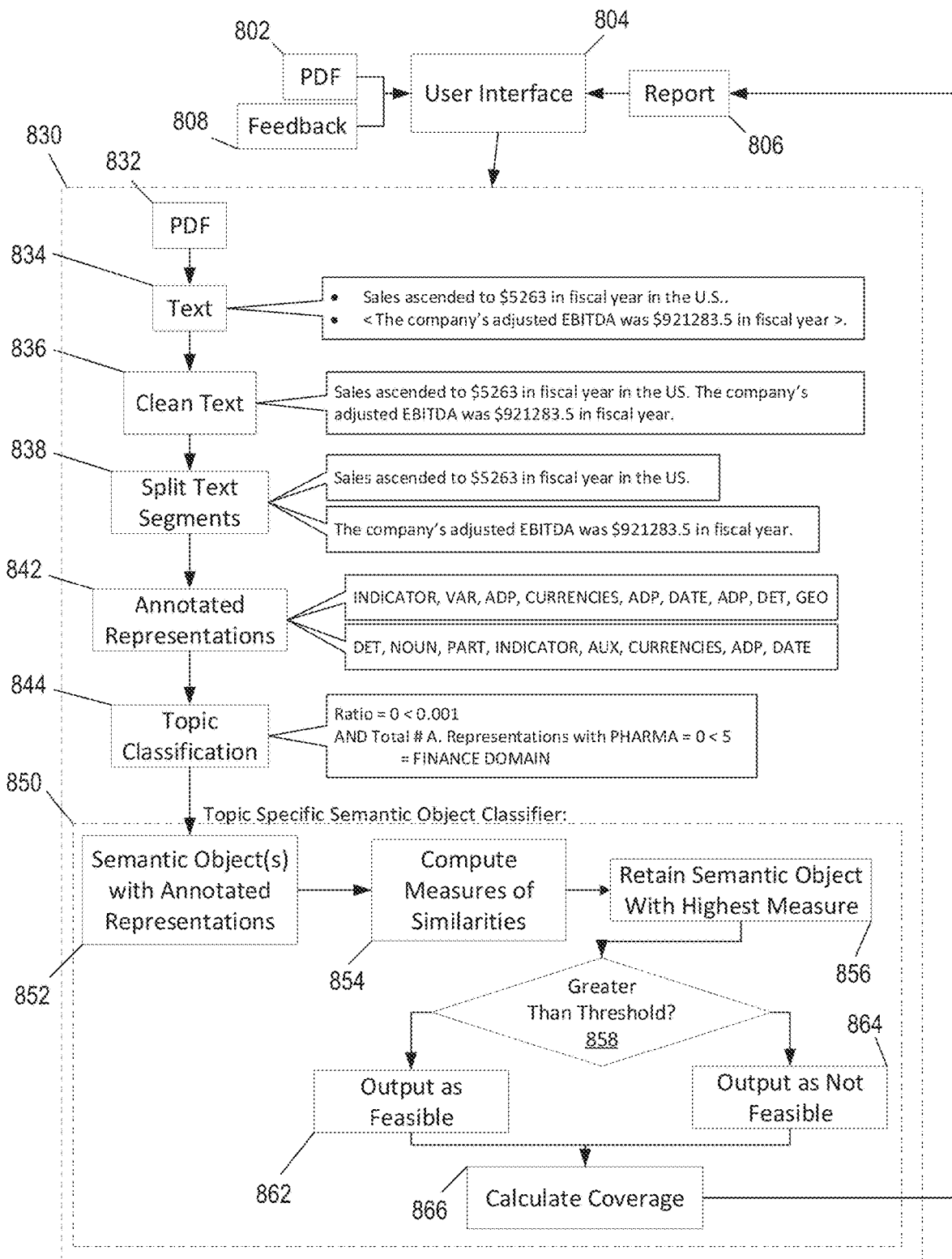
FIG. 8A is an example of determining a degree to which text segments can be generated using the NLG system configured with semantic objects, in accordance with some embodiments of the technology described herein.

FIG. 8A is an example of the illustrative technique for determining a degree to which a text segment can be generated using the NLG system configured with semantic objects, in accordance with some embodiments of the technology described herein.

As shown in the example, a user may upload a PDF 802 of an example document through user interface 804. For the purpose of this example, the document is a financial report summarizing financial information about a particular organization.

Once uploaded through user interface 804, NLP techniques 830 are used to process the document and determine whether at least some portions of the document can be automatically generated by an NLG system using semantic objects that are configured to generate text for the system.

Text 834 is extracted from uploaded PDF 832 using a standard converter, such as PDF miner. For this example, the text extracted from the document is:

"Sales increased to $5263 in fiscal year in the U.S.
< The company's adjusted EBITDA was $921283.5 in fiscal year>."

As shown, text 834 includes non-ASCII characters, XML markup, and acronyms with different formatting. As such, text 834 is cleaned to address these issues. Clean text 836 includes:

"Sales ascended to $5263 in fiscal year in the US. The company's adjusted EBITDA was $921283.5 in fiscal year."

As shown, clean text 834 retains the textual elements and ASCII characters. It does not include the bullet points, it transforms the XML markup (e.g., ">"), and it normalizes the acronyms (e.g., U.S. to US).

Once the text is cleaned, it is split into text segments 838. In this example, the text is split into sentences using boundary parameters, such as "." and "?". As a result, the two sentences included in clean text 836, are split into separate text segments. Each text segment is then tagged according to the techniques described herein including with respect to FIG. 4B to obtain annotated representations 842. For example, "sales," included in the first text segment, belongs to a vocabulary of words related to financial indicators. The vocabulary is associated with the tag "INDICATOR," which is then included in the annotated representation.

Annotated representations 842 are then used for topic classification 844, during which a topic is identified for the document. For this example, process 700 is used to determine whether the document has a topic related to the pharmaceutical industry. Else, the document is classified as having a topic related to finance. As shown, neither of the annotated representations 842 includes the tag "PHARMA." As a result, the ratio between the number of annotated representations that include the tag "PHARMA" is 0/2, which is less than the example specified threshold of 0.001. Since the ratio does not exceed the threshold, the finance topic is identified for the document. Even if the second condition were to be met, process 700 may require that both conditions be met for the document to be classified as having a topic related to the pharmaceutical industry.

Once a topic is identified for the document, each of the annotated representations 842 is used as input to the Topic Specific Semantic Object Classifier 850. The Topic Specific Semantic Object Classifier 850 includes semantic object(s) associated with annotated representation 852. Since the finance topic was identified for the document during the Topic Classification 844 stage, a subset of the semantic objects related to finance is used for the Topic Specific Semantic Object Classifier 850. The semantic objects may include semantic objects that are configured to generate text related to finance. They may not include semantic objects that are configured to generate text related to a pharmaceutical topic, since that topic was not identified for the document.

Each of the annotated representations 842 is compared with each of the annotated representations 852 that are associated with the semantic objects. For example, the first annotated representation, "INDICATOR, VAR, ADP, CURRENCIES, ADP, DATE, ADP, DET, GEO," may be compared to 120 annotated representations associated with a first semantic object, 5,000 annotated representations associated with a second semantic object, and 200 annotated representations associated with a third semantic object. A measure of similarity will be computed at act 854 for each of those comparisons. For each semantic object, the highest measure of similarity will be retained, resulting in three measures of similarities that represent each of the three semantic objects.

For example, the measures of similarities may include 40%, 55%, and 33%, for the first, second, and third semantic object, respectively.

Next, the semantic object with the highest measure of similarity will be retained at act 856. In this case, the second semantic object will be retained, with a measure of similarity of 55%. The measure of similarity is then compared to a specified threshold at act 858. For this example, let the threshold be 40%. Since the measure of similarity (e.g., 55%) is greater than the threshold, then the classifier will output that it is feasible to generate the first text using the second semantic object.

This would then be repeated for the second annotated representation, associated with the second text segment. The second annotated representation would be compared to the 5,320 annotated representations to determine measures of similarities. For the purpose of this example, let the three retained measures of similarities be 22%, 18%, and 11% for the first, second and third semantic objects, respectively. Since the largest measure of similarity, 22%, does not exceed the threshold of 40%, then the classifier will output that it is not feasible to automatically generate the second text segment using any of the semantic objects.

Since all of the text segments have been evaluated, a coverage is calculated that indicates the degree to which the document can be generated. Since, one out of the two text segments can be automatically generated using the NLG system, 50% of the document can be generated by the NLG system using the semantic objects.

Report 806 is then output though user interface 804, summarizing the coverage and other results of the Topic Classification 844 and/or Topic Specific Semantic Object Classification 850. A user can provide feedback 808 through user interface 804, which will be stored in one or more databases to augment the system for future iterations.

FIG. 8B is an example of a technique for determining a measure of similarity between annotated representations of respective text segments, in accordance with some embodiments of the technology described herein.

The example includes determining a measure of similarity 880 between two annotated representations 870. The first annotated representation (ts1) is an annotated representation generated for a text segment included in a document. The second annotated representation (so1) is an annotated representation associated with a semantic object.

As shown, computing the example measure of similarity 880 includes the equation:

$$\text{score}(ts1, so1) = \text{similarity}(ts1, so1) \times \text{cosine}(ts1, so1)^2$$

$$\text{where similarity}(ts1, so1) = \frac{\text{len}(ts1) + \text{len}(so1) - \text{levenshtein}(ts1, so1)}{\text{len}(ts1) + \text{len}(so1)},$$

$$\text{and cosine}(ts1, so1) = \frac{ts1 \cdot so1}{|ts1||so1|}$$

The equation 882 for computing similarity(ts1, so1), includes computing len(ts1) and len(so1) (e.g., the number of tags included in each annotated representation) and computing the Levenshtein distance based on the tags in annotated representations 870 (e.g., rather than based on the characters). Computing the Levenshtein distance includes determining the minimum number of changes to transform one annotated representation to the other. In this example, by inserting the tag "PERCENT" and removing the tags "VAR," "DET," and "GEO" from the second annotated representation (so1), the first annotated representation (ts1) is obtained. Therefore, the Levenshtein distance is 4 (due to the 4 changes).

As a result, the measure of similarity between the first annotated representation (ts1, so1) is 0.41, which may also be converted to a percentage (e.g., 40%) or to any other suitable format. In context of the techniques described herein including with respect to FIGS. 4A-C, measures of similarities can then be determined between the annotated representation (ts1) associated with the text segment and any other annotated representations that are associated with the same semantic object as the annotated representation (so1). The largest measure of similarity will then be retained for that semantic object.

Further, measures of similarities can be determined between the annotated representation (ts1) and annotated representations associated with other semantic objects. For each of those semantic objects, the largest measure of similarity will be retained, so that each semantic object is associated with a measure of similarity. The semantic object that is associated with the largest measure of similarity may be identified for text segment associated with the annotated representation (ts1).

Figure 9:
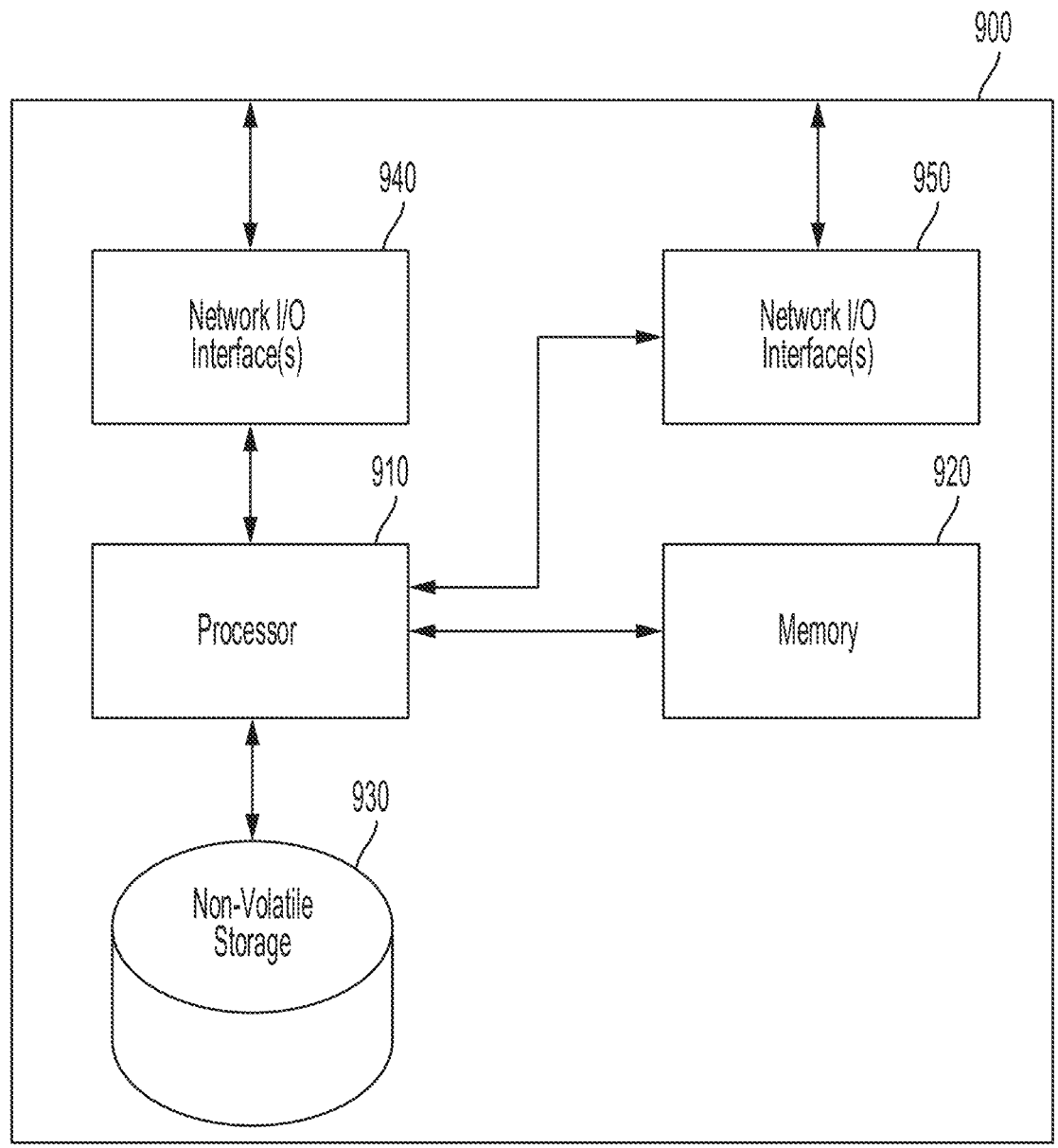
FIG. 9 is a block diagram of an illustrative computer system that may be used in implementing some embodiments of the technology described herein.

An illustrative implementation of a computer system 900 that may be used in connection with any of the embodiments of the disclosure provided herein is shown in FIG. 9. The computer system 900 may include one or more processors 910 and one or more articles of manufacture that comprise non-transitory computer-readable storage media (e.g., memory 920 and one or more non-volatile storage media 930). The processor(s) 910 may control writing data to and reading data from the memory 920 and the non-volatile storage device 930 in any suitable manner, as the aspects of the technology described herein are not limited in this respect. To perform any of the functionality described herein, the processor(s) 910 may execute one or more processor-executable instructions stored in one or more non-transitory computer-readable storage media (e.g., the memory 920), which may serve as non-transitory computer-readable storage media storing processor-executable instructions for execution by the processor(s) 910.

The terms "program" or "software" are used herein in a generic sense to refer to any type of computer code or set of processor-executable instructions that can be employed to program a computer or other processor to implement various aspects of embodiments as described herein. Additionally, in some embodiments, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided including with reference to FIGS. 4A-C. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "substantially", "approximately", and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for determining a degree to which a document can be generated using a natural language generation (NLG) system, the NLG system being configured to generate natural language text using semantic objects, the method comprising:
   using at least one computer hardware processor to perform:
   (A) obtaining a document comprising text segments;
   (B) determining a degree to which at least some of the text segments can be generated using the NLG system and at least some of the semantic objects;
   (C) generating a report indicating the degree to which the at least some of the text segments can be generated using the NLG system and the at least some of the semantic objects; and
   (D) outputting the report,
   wherein the at least some of the text segments include a first text segment, and wherein (B) comprises:
      generating a first annotated representation for the first text segment; and
      determining, for each semantic object of one or more of the at least some of the semantic objects, a degree to which the first text segment can be generated by the NLG system using the semantic object, the determining comprising:
         accessing a plurality of annotated representations for text segments associated with the semantic object;
         determining measures of similarity between the first annotated representation and the plurality of annotated representations; and
         determining, using the measures of similarity, the degree to which the first text segment can be generated by the NLG system using the semantic object.

2. The method of claim 1, wherein the NLG system is configured to generate natural language text for a plurality of topics using a respective plurality of subsets of the semantic objects, wherein each subset of the semantic objects is associated with a respective topic in the plurality of topics, the method further comprising:
   processing the document to identify a topic for the document from among the plurality of topics, wherein (C) comprises:
   determining the degree to which the at least some of the text segments in the document can be generated using the NLG system and at least some of the subset of semantic objects associated with the topic for the document.

3. The method of claim 1, wherein generating the first annotated representation for the first text segment comprises:
   tagging words in the first text segment using tags in a plurality of tags.

4. The method of claim 3, wherein the plurality of tags includes a first tag associated with a first vocabulary in a plurality of vocabularies.

5. The method of claim 4, wherein tagging words in the first text segment using the tags in the plurality of tags comprises:
   determining whether a word in the first text segment is included in a first vocabulary of the plurality of vocabularies; and
   when it is determined that the word in the first text segment is in the first vocabulary of the plurality of vocabularies, tagging the word with the first tag.

6. The method of claim 5, wherein tagging words in the first text segment using the tags in the plurality of tags further comprises:
   when it is determined that the word in the first text segment is not included in any of the plurality of vocabularies, determining a part-of-speech for the word; and
   tagging the word using a tag associated with the part-of-speech determined for the word.

7. The method of claim 4, wherein the plurality of vocabularies includes: a vocabulary having words and/or symbols related to currency, a vocabulary having words and/or symbols related to geography, a vocabulary having words and/or symbols related to diseases, a vocabulary having words and/or symbols related to drugs, a vocabulary having words and/or symbols related to financial indicators, a vocabulary having words and/or symbols related to dates, a vocabulary having words and/or symbols related to percentages, and/or a vocabulary having words and/or symbols related to variation.

8. The method of claim 3, wherein the plurality of annotated representations comprises a second annotated representation, and
   wherein determining measures of similarities between the first annotated representation and the plurality of annotated representations comprises:
determining a measure of similarity between the first annotated representation and the second annotated representation, the determining being performed using tags in the first and second annotated representations.

9. The method of claim 8, wherein determining the measure of similarity between the first annotated representation and the second annotated representation comprises determining a Levenshtein distance among the tags in the first and second annotated representations.

10. The method of claim 1, wherein determining the degree to which the first text segment can be generated by the NLG system using the semantic object comprises identifying a first measure of similarity from among the measures of similarities, the first measure of similarity being associated with a largest measure of similarity from among the measures of similarities.

11. The method of claim 1, wherein generating the report comprises generating the report to include information indicative of:
   a first semantic object of the one or more of the at least some semantic objects that can be used to generate the first text segment; and
   a degree to which the first text segment can be generated using the first semantic object and the NLG system.

12. The method of claim 1, wherein generating the report comprises generating the report to indicate information indicative of a degree to which one or more regions of the document can be generated using the NLG system and the at least some of the semantic objects.

13. The method of claim 1, wherein at least some of the text segments includes second and third text segments; and
   wherein generating the report comprises generating the report to include information indicative of:
      the second text segment when a degree to which the second text segment can be generated using the NLG system and the at least some of the semantic objects exceeds a specified threshold; and
      the third text segment when a degree to which the third text segment can be generated using the NLG system and the at least some of the semantic objects does not exceed the specified threshold.

14. The method of claim 1, wherein outputting the report comprises outputting the report through a graphical user interface (GUI).

15. The method of claim 14, wherein the GUI is interactive; and
   wherein the GUI includes selectable elements through which a user can provide input to associate a particular semantic object to a particular text segment.

16. The method of claim 1, wherein the semantic objects include a first semantic object associated with one or more data variables, one or more attributes, a vocabulary, and a document structure.

17. The method of claim 1, wherein the first text segment includes one or more words, a part of a sentence, a sentence, and/or multiple sentences.

18. A system comprising:
   at least one computer hardware processor; and
   at least one non-transitory computer-readable storage medium storing processor executable instructions that, when executed by the at least one computer hardware processor, cause the at least one computer hardware processor to perform:
      (A) obtaining a document comprising text segments;
      (B) determining a degree to which at least some of the text segments can be generated using an NLG system and at least some semantic objects;
      (C) generating a report indicating the degree to which the at least some of the text segments can be generated using the NLG system and the at least some of the semantic objects; and
      (D) outputting the report,
      wherein the at least some of the text segments include a first text segment, wherein (B) comprises:
         generating a first annotated representation for the first text segment; and
         determining, for each semantic object of one or more of the at least some of the semantic objects, a degree to which the first text segment can be generated by the NLG system using the semantic object, the determining comprising:
            accessing a plurality of annotated representations for text segments associated with the semantic object;

determining measures of similarity between the first annotated representation and the plurality of annotated representations; and determining, using the measures of similarity, the degree to which the first text segment can be generated by the NLG system using the semantic object.

19. At least one non-transitory computer-readable storage medium storing processor executable instructions that, when executed by at least one computer hardware processor, cause the at least one computer hardware processor to perform:

(A) obtaining a document comprising text segments;

(B) determining a degree to which at least some of the text segments can be generated using an NLG system and at least some semantic objects;

(C) generating a report indicating the degree to which the at least some of the text segments can be generated using the NLG system and the at least some of the semantic objects; and (D) outputting the report, wherein the at least some of the text segments include a first text segment, wherein (B) comprises:

generating a first annotated representation for the first text segment; and determining, for each semantic object of one or more of the at least some of the semantic objects, a degree to which the first text segment can be generated by the NLG system using the semantic object, the determining comprising:

accessing a plurality of annotated representations for text segments associated with the semantic object;

determining measures of similarity between the first annotated representation and the plurality of annotated representations; and determining, using the measures of similarity, the degree to which the first text segment can be generated by the NLG system using the semantic object.

* * * * *

UNITED STATES PATENT AND TRADEMARK OFFICE
CERTIFICATE OF CORRECTION

| | |
|---|---|
| PATENT NO. | : 11,734,517 B1 |
| APPLICATION NO. | : 17/683060 |
| DATED | : August 22, 2023 |
| INVENTOR(S) | : Hanna Abi-Akl et al. |

It is certified that error appears in the above-identified patent and that said Letters Patent is hereby corrected as shown below:

On the Title Page

Item (71) Applicant:
"Applicant: YSEOP SA, Lyons (FR)"
Should read:
--Applicant: YSEOP SA, Lyon (FR)--

Item (73) Assignee:
"Assignee: YSEOP SA, Lyons (FR)"
Should read:
--Assignee: YSEOP SA, Lyon (FR)--

Signed and Sealed this
Seventeenth Day of October, 2023

Katherine Kelly Vidal
*Director of the United States Patent and Trademark Office*